(12) United States Patent
Kim

(10) Patent No.: US 10,997,371 B2
(45) Date of Patent: May 4, 2021

(54) AUTOMATIC RESPONSE SERVER DEVICE, TERMINAL DEVICE, RESPONSE SYSTEM, RESPONSE METHOD, AND PROGRAM

(71) Applicant: JE International Corporation, Gifu (JP)

(72) Inventor: Minsu Kim, Gifu (JP)

(73) Assignee: JE International Corporation, Gifu (JP)

( * ) Notice: Subject to any disclaimer, the term of this patent is extended or adjusted under 35 U.S.C. 154(b) by 0 days.

(21) Appl. No.: 16/300,364

(22) PCT Filed: Jun. 7, 2018

(86) PCT No.: PCT/JP2018/021857
§ 371 (c)(1),
(2) Date: Nov. 9, 2018

(87) PCT Pub. No.: WO2019/012872
PCT Pub. Date: Jan. 17, 2019

(65) Prior Publication Data
US 2019/0147045 A1 May 16, 2019

(30) Foreign Application Priority Data
Jul. 14, 2017 (JP) .............................. JP2017-138423

(51) Int. Cl.
*G10L 17/22* (2013.01)
*G06F 40/30* (2020.01)
(Continued)

(52) U.S. Cl.
CPC .............. *G06F 40/30* (2020.01); *G06F 13/00* (2013.01); *G06F 40/35* (2020.01); *G06N 5/04* (2013.01);
(Continued)

(58) Field of Classification Search
CPC .. G06F 16/3329; G06F 3/0484; G06F 40/194; G06F 40/247; G06F 40/30;
(Continued)

(56) References Cited

U.S. PATENT DOCUMENTS 10,558,335 B2 * 2/2020 Henmi .................. G06F 3/0484
2008/0189367 A1 8/2008 Okumura
(Continued)

FOREIGN PATENT DOCUMENTS

JP 2003-108375 A 4/2003
JP 2004-145541 A 5/2004
(Continued)

OTHER PUBLICATIONS

International Search Report, dated Sep. 11, 2018 for corresponding International patent application No. PCT/JP2018/021857.
(Continued)

*Primary Examiner* — Vijay B Chawan
(74) *Attorney, Agent, or Firm* — Abelman, Frayne & Schwab; Stefan Knirr

(57) ABSTRACT

A response system which realizes an automatic chatting response while reducing investment to a computer necessary for a learning process in artificial intelligence is provided. A chat pattern generation unit of a terminal device generates information on a chat pattern which is a pattern of input fragments which are inputs in a chat and response fragments which are responses to the input fragments. A learning processing unit performs a learning process on the relationship between input text corresponding to the input fragments and the response fragments on the basis of the generated chat pattern and outputs input interpretation knowledge data acquired as a result of the learning process. A response knowledge data transmission unit transmits response knowledge data based on response fragments included in the chat
(Continued)

pattern generated by the chat pattern generation unit to an automatic response server device. An input interpretation knowledge data transmission unit transmits input interpretation knowledge data output from the learning processing unit to the automatic response server device.

13 Claims, 13 Drawing Sheets

(51) Int. Cl.
*H04L 12/58* (2006.01)
*G06N 5/04* (2006.01)
*G06F 13/00* (2006.01)
*G06F 40/35* (2020.01)
*G10L 13/00* (2006.01)

(52) U.S. Cl.
CPC .............. *G10L 13/00* (2013.01); *H04L 51/02* (2013.01); *G10L 17/22* (2013.01)

(58) Field of Classification Search
CPC ...... G06F 16/00; G06F 15/285; G06F 16/332; G06F 16/3334; G06F 16/3444; G06F 16/3347; G06F 16/338; G06F 16/9535; G06F 40/205; G06F 40/35; G06N 20/00; G06N 7/00; G06N 5/003; G06N 5/04; G06N 5/041; G10L 13/00; G10L 17/00; G10L 17/22
USPC ...... 704/270.1, 270, 275, 257, 9; 705/14.66, 705/14.69; 706/11, 12, 47, 55, 59; 707/741, 748, 771
See application file for complete search history.

(56) References Cited

U.S. PATENT DOCUMENTS

| | | | | |
|---|---|---|---|---|
| 2009/0099840 | A1* | 4/2009 | Ishikawa | G06F 16/332 704/9 |
| 2010/0070448 | A1* | 3/2010 | Omoigui | H01L 27/14647 706/47 |
| 2010/0240018 | A1* | 9/2010 | Bethune | G09B 7/02 434/309 |
| 2011/0258049 | A1* | 10/2011 | Ramer | G06Q 30/0273 705/14.66 |
| 2015/0026106 | A1* | 1/2015 | Oh | G06F 16/3347 706/12 |
| 2016/0148105 | A1* | 5/2016 | Henmi | G06F 3/0484 706/11 |
| 2016/0330156 | A1 | 11/2016 | Dunne | |
| 2017/0006161 | A9 | 1/2017 | Riahi et al. | |
| 2017/0230312 | A1* | 8/2017 | Barrett | H04L 51/02 |
| 2017/0242915 | A1* | 8/2017 | Torisawa | G06F 16/00 |

FOREIGN PATENT DOCUMENTS

| | | |
|---|---|---|
| JP | 2008-512789 A | 4/2008 |
| JP | 2016-024765 A | 2/2016 |
| JP | 2016-45652 A | 4/2016 |
| JP | 2016-099967 A | 5/2016 |
| JP | 2017-010517 A | 12/2017 |
| KR | 10-2010-0006361 A | 1/2010 |
| KR | 10-2015-007519 A | 7/2015 |
| KR | 10-2015-0075191 A | 7/2015 |
| RU | 2353068 C2 | 4/2009 |
| RU | 2607643 C2 | 1/2017 |

OTHER PUBLICATIONS

Notice of Allowance, dated Aug. 29, 2017, for corresponding Japanese Application No. 2017-138423.
Office Action, dated May 2, 2018 in corresponding Korean Application No. 10-2018-0001638.
Office Action dated Oct. 22, 2020 in corresponding Russian application No. 2019136488/28(072013).
Office Action dated Mar. 5, 2021 in corresponding European application No. 218832858.

* cited by examiner

FIG. 10

CHAT PATTERN REGISTRATION SCREEN

CHAT PATTERN REGISTRATION

| TITLE | METHOD OF GETTING THERE |
| REPRESENTATIVE INPUT | PLEASE LET ME KNOW HOW TO GET THERE |
| SIMILAR INPUT | HOW DO I GET THERE? |
| | HOW CAN I GET TO THE STORE? |
| | LET ME KNOW THE WAY OF GOING BY MEANS OF TRANSPORTATION |

INCREASE

| DIVISION | 1 | 2 | 3 |
| | SHINKANSEN | SUBWAY | BUS |

MEMBER RESPONSE: EXIT THROUGH THE YAESU CENTRAL GATE OF SHINKANSEN TOKYO STATION. LEAVE THE EXIT AND WALK ABOUT 100 M TO THE LEFT. IF YOU WALK TO THE RIGHT ABOUT 30 M FROM THE POINT WHERE YOU WILL SEE A KIOSK, YOU CAN SEE A CONVENIENCE STORE. THE STORE IS ON THE THIRD FLOOR OF THAT BUILDING.

( DOWNLOAD ) ( REGISTER ) ( DELETE ) ( SAVE )

FIG. 11

SYNONYM DICTIONARY REGISTRATION SCREEN

SYNONYM DICTIONARY REGISTRATION

SEARCH  BUSINESS TIME

KEYWORD  SYNONYM

1  BEGINNING TIME   START TIME/TIME OF OPENING/OPEN TIME              REGISTER  DELETE

2  BUSINESS START   BUSINESS START TIME/TIME OF BUSINESS START/START OF BUSINESS   REGISTER  DELETE

3  LAST ORDERS      LAST ORDER/FINAL ORDER/FINAL ORDERS               REGISTER  DELETE

SYNONYM DICTIONARY REGISTRATION

ADD KEYWORD                 SYNONYM

BUSINESS BEGINNING TIME     BUSINESS BEGINNING HOUR

REGISTER    DELETE                SAVE

AUTOMATIC RESPONSE SERVER DEVICE, TERMINAL DEVICE, RESPONSE SYSTEM, RESPONSE METHOD, AND PROGRAM

CROSS REFERENCE TO RELATED APPLICATIONS

This application is a national phase of PCT application No. PCT/JP2018/021857, filed Jun. 7, 2018, which claims priority to Japanese Patent Application No. 2017-138423, filed Jul. 14, 2017, all of which are incorporated herein by reference thereto.

TECHNICAL FIELD

The present invention relates to an automatic response server device, a terminal device, a response system, a response method, and a program.

BACKGROUND ART

A type of system for conversation according to exchange of relatively short messages has come into wide use. Although such a system has various forms and names, it is called a "chat system" as a representative herein. Such a chat system is frequently used for communication between individuals but use thereof for business purposes is also conceivable. Business operators may use a chat system for the purpose of public relations, advertisement and the like and for some customer service purposes. Here, some customer services are activities of responding to inquiries from customers and providing information to customers.

Meanwhile, artificial intelligence technology has increasingly improved and has an increasingly wide application.

It is possible to rapidly respond to various questions and requests for provision of information from customers by combining the aforementioned chat service technology and artificial intelligence technology.

Patent Literature 1 discloses a human-machine chatting method which acquires a user's intention on the basis of an input signal and outputs a signal corresponding to the user's intention by using artificial intelligence.

CITATION LIST

Patent Literature

[Patent Literature 1]
Japanese Unexamined Patent Application, First Publication No. 2017-010517

SUMMARY OF INVENTION

Technical Problem

When a chatting process is performed using artificial intelligence, it is necessary to perform both a learning process for optimally adjusting a model for administering the input/output in chats and a process of performing the input/output in chats using a learnt model.

To realize smooth and accurate chatting, the learning process which is performed in advance is important. Particularly, in applications which require the learning process to be frequently performed, it is necessary to allocate sufficient computation resources (CPU time and the like) to not only the process of executing input/output but also the learning process.

However, it is necessary to use a large-scale and expensive computer to perform both the process of executing the input/output in chats and the learning process adequately. Particularly, the learning process consumes a very large amount of computation resources. That is, there is a problem that a system to be constructed incurs high costs.

The present invention devised on the basis of recognition of the aforementioned problems provides an automatic response server, a terminal device, a response system, a response method, and a program in which an amount of investment in a computer necessary for a learning process in artificial intelligence can be reduced.

Solution to Problem

[1] In order to achieve the aforementioned object, a response system according to one aspect of the present invention includes an automatic response server device and a plurality of terminal devices, wherein the terminal devices include: a chat pattern generation unit which generates information on a chat pattern which is a pattern of input fragments which are inputs to the automatic response server device and response fragments which are responses from the automatic response server to the input fragments in chatting; a learning processing unit which performs a learning process on the relationship between input text corresponding to the input fragments and the response fragments on the basis of the chat pattern generated by the chat pattern generation unit and outputs input interpretation knowledge data acquired as a result of the learning process; a response knowledge data transmission unit which transmits response knowledge data based on the response fragments included in the chat pattern generated by the chat pattern generation unit to the automatic response server device; and an input interpretation knowledge data transmission unit which transmits the input interpretation knowledge data output from the learning processing unit to the automatic response server device, and the automatic server device includes: a response knowledge data storage unit which stores the response knowledge data transmitted from the response knowledge data transmission unit of the terminal devices; an input interpretation knowledge data storage unit which stores the input interpretation knowledge data transmitted from the input interpretation knowledge data transmission unit of the terminal devices; and an inference engine unit which outputs a response in a chat by inferring, on the basis of input text in the chat and the input interpretation knowledge data stored in the input interpretation knowledge data storage unit, the response fragments corresponding to the input text in the chat, from response knowledge data stored in the response knowledge data storage unit, and reading response knowledge data corresponding to the inferred response fragments from the response knowledge data storage unit.

[2] In one aspect of the present invention, the aforementioned response system further includes a prototype database server device including a prototype storage unit which stores a prototype of the chat pattern, wherein the chat pattern generation unit generates the information on the chat pattern on the basis of the prototype acquired from the prototype database server device.

[3] In one aspect of the present invention, the prototype database server device includes a field information management unit which manages information on a field to which the prototype belongs, and the prototype is managed by being associated with the field in the aforementioned response system.

[4] In one aspect of the present invention, the terminal devices further include an access information acquisition unit which acquires access information for accessing a chat in which the result of the learning process is reflected when the learning process performed by the learning processing unit is completed in the aforementioned response system.

[5] In one aspect of the present invention, the automatic response server device further includes an access information generation unit which generates image information including the access information which is optically readable, and the access information acquisition unit acquires image information including the optically readable access information generated by the access information generation unit in the aforementioned response system.

[6] In one aspect of the present invention, the inference engine unit is connected to a chat server device which provides a service of chatting between users to perform chatting with a general user terminal device through the chat server device, the input text in the chat is transmitted from the general user terminal device to the inference engine unit through the chat server device, and the response in the chat is output by the inference engine unit and transmitted to the general user terminal device through the chat server device in the aforementioned response system.

[7] In one aspect of the present invention, the aforementioned response system further includes a general user terminal device which transmits the input text in the chat to the inference engine unit through the chat server device and receives the response output from the inference engine unit through the chat server device.

[8] In one aspect of the present invention, the aforementioned response system further includes a general user terminal device which reads the access information acquired by the access information acquisition unit in the terminal devices according to an optical reading device, accesses the chat on the basis of the read access information, transmits the input text in the chat to the inference engine unit through the chat server device, and receives the response output from the inference engine unit through the chat server device.

[9] One aspect of the present invention is a response method using an automatic response server device and a plurality of terminal devices, which include, in the terminal devices: a chat pattern generation unit generating information of a pattern of input fragments which are inputs to the automatic response server device and response fragments which are responses from the automatic response server to the input fragments in chatting; a learning processing unit performing a learning process on the relationship between input text corresponding to the input fragments and the response fragments on the basis of the chat pattern generated by the chat pattern generation unit and outputting input interpretation knowledge data acquired as a result of the learning process; a response knowledge data transmission unit transmitting response knowledge data based on the response fragments included in the chat pattern generated by the chat pattern generation unit to the automatic response server device; and an input interpretation knowledge data transmission unit transmitting the input interpretation knowledge data output from the learning processing unit to the automatic response server device, and in the automatic server device, a response knowledge data storage unit storing the response knowledge data transmitted from the response knowledge data transmission unit of the terminal devices; an input interpretation knowledge data storage unit storing the input interpretation knowledge data transmitted from the input interpretation knowledge data transmission unit of the terminal devices; and an inference engine unit outputting a response in a chat by inferring, on the basis of input text in the chat and the input interpretation knowledge data stored in the input interpretation knowledge data storage unit, the response fragments corresponding to the input text in the chat, from response knowledge data stored in the response knowledge data storage unit, and reading response knowledge data corresponding to the inferred response fragments from the response knowledge data storage unit.

[10] One aspect of the present invention is a terminal device including: a chat pattern generation unit which generates information on a chat pattern which is a pattern of input fragments which are inputs to an automatic response server device and response fragments which are responses from the automatic response server device to the input fragments in chatting; a learning processing unit which performs a learning process on the relationship between input text corresponding to the input fragments and the response fragments on the basis of the chat pattern generated by the chat pattern generation unit and outputs input interpretation knowledge data acquired as a result of the learning process; a response knowledge data transmission unit which transmits response knowledge data based on the response fragments included in the chat pattern generated by the chat pattern generation unit to the automatic response server device; and an input interpretation knowledge data transmission unit which transmits the input interpretation knowledge data output from the learning processing unit to the automatic response server device.

[11] One aspect of the present invention is an automatic server device including: a response knowledge data storage unit which stores response fragments which are responses to input fragments which are inputs in a chat as response knowledge data on the basis of a chat pattern generated in an external terminal device; an input interpretation knowledge data storage unit which stores input interpretation knowledge data which is input interpretation knowledge data generated according to a learning process in the terminal device and is acquired as a result of the learning process performed on the relationship between input text corresponding to the input fragments in the chat pattern and response fragments corresponding to the input fragments; and an inference engine unit which outputs a response in a chat by inferring, on the basis of input text in the chat and the input interpretation knowledge data stored in the input interpretation knowledge data storage unit, the response fragments corresponding to the input text in the chat, from response knowledge data stored in the response knowledge data storage unit, and reading response knowledge data corresponding to the inferred response fragments from the response knowledge data storage unit.

[12] One aspect of the present invention is a program for causing a computer to serve as a terminal device including: a chat pattern generation unit which generates information on a chat pattern which is a pattern of input fragments which are inputs to an automatic response server device and response fragments which are responses from the automatic response server to the input fragments in chatting; a learning processing unit which performs a learning process on the relationship between input text corresponding to the input fragments and the response fragments on the basis of the chat pattern generated by the chat pattern generation unit and outputs input interpretation knowledge data acquired as a result of the learning process; a response knowledge data transmission unit which transmits response knowledge data based on the response fragments included in the chat pattern generated by the chat pattern generation unit to the automatic response server device; and an input interpretation knowledge data transmission unit which transmits the input interpretation knowledge data output from the learning processing unit to the automatic response server device.

[13] One aspect of the present invention is a program for causing a computer including: a response knowledge data storage unit which stores response fragments which are responses to input fragments which are inputs in a chat as response knowledge data on the basis of a chat pattern generated in an external terminal device; and an input interpretation knowledge data storage unit which stores input interpretation knowledge data which is input interpretation knowledge data generated according to a learning process in the terminal device and is acquired as a result of the learning process performed on the relationship between input text corresponding to the input fragments in the chat pattern and response fragments corresponding to the input fragments, to serve as an automatic response server device including an inference engine unit which outputs a response in a chat by inferring, on the basis of input text in the chat and the input interpretation knowledge data stored in the input interpretation knowledge data storage unit, the response fragments corresponding to the input text in the chat, from response knowledge data stored in the response knowledge data storage unit, and reading response knowledge data corresponding to the inferred response fragments from the response knowledge data storage unit.

Advantageous Effects of Invention

According to the present invention, it is possible to perform learning of artificial intelligence and to realize automatic response in chats on the basis of a learning result without a heavy load for the learning process being imposed on the automatic response server device.

According to the present invention, a user of a member terminal device is able to easily construct a response system customized for their business by creating a chat pattern.

Particularly, according to one aspect of the present invention, the user of the member terminal device downloads a prototype of a chat pattern prepared in advance from a prototype database server device. In addition, the user of the member terminal device creates a chat pattern by setting a response (e.g., a response to a question) to an input (e.g., the question) on the basis of the prototype, and the like. Accordingly, it is possible to construct a response system customized for the user's business more easily. Here, a prototype of a chat pattern may include examples of a representative input and similar inputs, for example.

BRIEF DESCRIPTION OF DRAWINGS

FIG. 10 is a schematic diagram showing an example of a screen for registering a chat pattern in the member terminal device 3 according to the present embodiment.

FIG. 11 is a schematic diagram showing an example of a screen for editing/registering a synonym dictionary in the member terminal device 3 according to the present embodiment.

DESCRIPTION OF EMBODIMENTS

Hereinafter, embodiments of the present invention will be described with reference to the drawings.

First Embodiment

Figure 1:
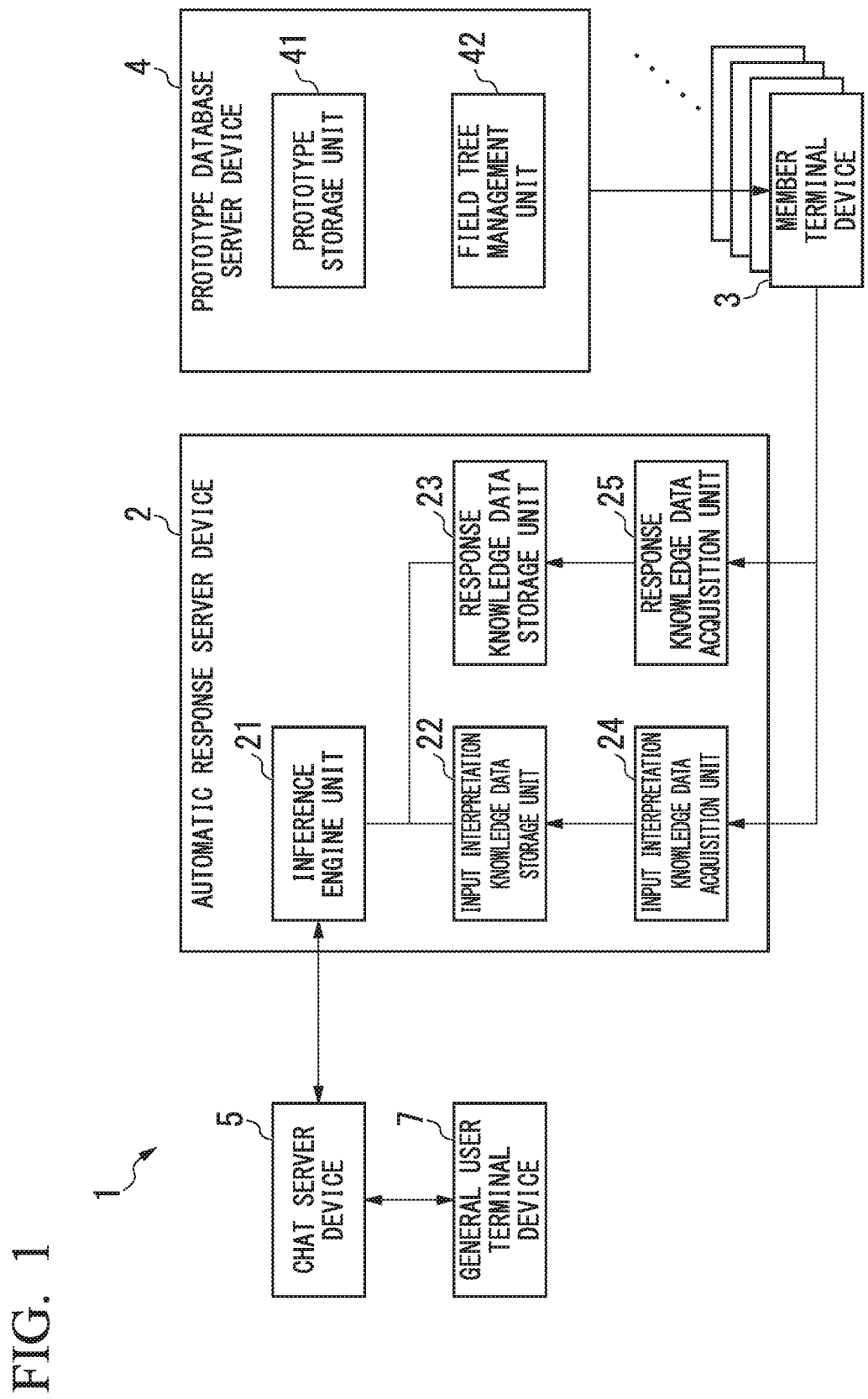
FIG. 1 is a block diagram showing a schematic functional configuration of a response system 1 according to a first embodiment of the present invention.

FIG. 1 is a block diagram showing a schematic functional configuration of a response system according to a first embodiment of the present invention. As shown, the response system 1 includes an automatic response server device 2, a member terminal device 3 (terminal device), a prototype database server device 4, a chat server device 5, and a general user terminal device 7. The automatic response server device 2, the member terminal device 3, the prototype database server device 4 and the chat server device 5 may communicate with each other through a wired or wireless communication line or the like. For example, such communication may use an Internet protocol.

The function of each device shown in FIG. 1 may be realized using an electronic circuit, for example. Each function may include a storage means such as a semiconductor memory and a magnetic hard disk device therein as necessary. Each function may be realized by a computer and software.

In the present embodiment, an automatic response server operator holds and operates the automatic response server device 2 and the prototype database server device 4.

A member who uses services of an automatic response server holds and uses the member terminal device 3. Some software operating in the member terminal device 3 may be provided by the automatic response server operator.

A chat service operator holds and operates the chat server device 5.

The chat service operator may be the same as the aforementioned automatic response server operator.

A general user accesses the chat server device 5 using the general user terminal device 7 and is provided with services. The general user is an unspecified individual.

The overview of each device in the response system 1 is as follows.

The automatic response server device 2 is a device having a function of receiving data input through a chat service and returning an appropriate response to the input. The automatic response server device 2 is operated as a server for a plurality of members. Members may be stores, restaurants, financial institutions, other business operators and the like, for example.

The member terminal device 3 is a terminal device used by members. The member terminal device 3 is also simply referred to as a "terminal device." For example, the member terminal device 3 may be realized by a personal computer (PC), a tablet type terminal device, a smartphone, or the like. The member terminal device 3 acquires a prototype of chat patterns from the prototype database server device 4. The member terminal device 3 has a function for editing and registering chat patterns on the basis of the acquired prototype. The member terminal device 3 performs a learning process on the basis of the registered chat pattern data and provides knowledge data which is a learning result to the automatic response server device 2. The knowledge data provided by the member terminal device 3 to the automatic response server device 2 includes input interpretation knowledge data and response knowledge data. Such knowledge data will be described later.

The prototype database server device 4 holds data of prototypes of chat patterns. For example, the prototype database server device 4 may be realized using software of a server type computer and a database management system (DBMS). In addition, the prototype database server device 4 manages a field tree. Chat patterns and the field tree will be described later in detail with reference to the drawings.

The chat server device 5 provides a chat service. For example, the chat server device 5 may be realized using a server type computer and software for performing the chat service.

The chat server device 5 provides a function of allowing chatting between two users to be performed.

In the response system 1, particularly, the chat server device 5 may allow chatting between the general user terminal device 7 and a virtual user implemented by the automatic response server device 2 to be performed. Although chatting using the chat server device 5 may also be performed using data (multimodal data) of types other than text, chatting performed using only text data is described herein. In general, the chat server device 5 realizes chatting between a user A and a user B. Text data input by the user A and text data input by the user B are displayed in a chat room (virtual room) shared by both users. The user A and the user B are able to display conversations according to text exchanged in the chat room on a screen and the like. In the response system 1, one of users of chatting is a virtual user in the automatic response server device 2. Specifically, a program of the automatic response server device 2 acquires text data in the chat room or transmits text data to the chat room through an application program interface (API). Accordingly, chatting between the general user terminal device 7 (user A) and a virtual user (user B, program) in the automatic response server device may be performed.

The general user terminal device 7 is a terminal device used by a general user. For example, the general user terminal device 7 may be realized by a PC, a tablet type terminal device, a smartphone, a wearable terminal and the like. The general user terminal device 7 has client software for using the chat service installed therein. The client software may be a general-purpose web browser or dedicated chat client software (application), for example.

The automatic response server device 2 shown in FIG. 1 includes an inference engine unit 21, an input interpretation knowledge data storage unit 22, a response knowledge data storage unit 23, an input interpretation knowledge data acquisition unit 24 and a response knowledge data acquisition unit 25. Each of these units may be realized using a computer program and a memory, for example. The function of each unit is as follows.

The inference engine unit 21 has a function of executing chatting with the general user terminal device 7 through the chat server device 5. In other words, the inference engine unit 21 has a function of operating as a virtual user performing chatting with the general user terminal device 7. Specifically, the inference engine unit 21 receives input text $T_{input}$ from the chat server device 5. The input text $T_{input}$ is text transmitted from the general user terminal device 7. Then, the inference engine unit 21 interprets the input on the basis of the received input text $T_{input}$ and infers a response most suitable for the interpreted input. The inference engine unit 21 returns the inferred most suitable response to a general user terminal side. Specifically, the inference engine unit 21 infers a correct answer represented by the following expression (1) when the input text $T_{input}$ is provided thereto.

$$\mathrm{argmax}_{(i)}(P(\mathrm{RESP}_i|T_{input};\theta)) \qquad (1)$$

In the expression (1), i is an index number of a response RESP. $\mathrm{RESP}_i$ is a response having an index number i. $\theta$ is a parameter value group for calculating $P(\mathrm{RESP}_i|T_{input};\theta)$. $P(\mathrm{RESP}_i|T_{input};\theta)$ is a conditional probability of $\mathrm{RESP}_i$ subject to $T_{input}$. However, $P(\mathrm{RESP}_i|T_{input};\theta)$ depends on the parameter value group $\theta$. The parameter value group $\theta$ is appropriately adjusted according to a learning process using teacher data. That is, the parameter value group $\theta$ is knowledge data (knowledge data for input interpretation) in artificial intelligence technology (machine learning technology). The input interpretation knowledge data is stored in the input interpretation knowledge data storage unit 22.

As described above, the inference engine unit 21 may be realized using artificial intelligence technology. As an example, the inference engine unit 21 is realized using a rule base and a multi-layer neural network. However, the inference engine unit 21 may be realized using other forms in the artificial intelligence field. When a neural network is used, the aforementioned parameter value group $\theta$ includes weight values in connection between neurons.

When an optimal correct answer is inferred on the basis of the input text $T_{input}$, the inference engine unit 21 reads data for generating output text in response to the inferred optimal response from the response knowledge data storage unit 23. Response knowledge data may be response text itself, for example. Alternatively, response knowledge data is a set of response knowledge data including a variable and a method for acquiring a specific value of the variable. In addition, the inference engine unit 21 generates response text data on the basis of the read response knowledge data. As described above, response text data may include a variable for filling a hole. Here, the inference engine unit 21 may appropriately read a specific value of the variable from a database which is not shown by executing the aforementioned method. As an example, when a response to be generated is a response of a balance of a bank account, response text data is "the balance of the account is <x> yen." Here, <x> included in the response text is a variable. With respect to a specific value of the variable <x>, the inference engine unit 21 reads a numerical value of the balance of the account of the corresponding user (an additional authentication process is performed with respect to whether the user is the account holder) from an account database which is not shown. A procedure for acquiring data of a specific value of a variable may be described as a method. The method will also be described later. Further, the inference engine unit 21 outputs text in which the variable <x> has been replaced by a specific numerical value as a response. As a specific example, text "the balance of the account is 12,345,678 yen" is output. The inference engine unit 21 returns the generated response text to the general user terminal device 7 through the chat server device 5.

That is, the inference engine unit 21 infers optimal response knowledge data (optimal response fragment) from response knowledge data stored in the response knowledge data storage unit 23 on the basis of characteristics of input in a chat and input inference knowledge data stored in the input interpretation knowledge data storage unit 22 and outputs output text of the chat on the basis of the inferred response fragment. Here, the inference engine unit 21 extracts characteristics of the input in the chat from input text in the chat. For example, a characteristic of input in a chat may be a characteristic word group in input text. In addition, a characteristic of a syntax in input text and other characteristics may be used as characteristics of input in a chat. Here, a characteristic of a syntax in input text is information representing a relationship between nodes in a syntax tree. Such information is information on a positional relationship and a distance between a specific word and another specific word in a syntax tree, and the like, for example. That is, the inference engine unit 21 outputs a response to a chat by inferring an optimal response fragment corresponding to input text in the corresponding chat from response knowledge data stored in the response knowledge data storage unit 23 on the basis of the input text in the chat and input interpretation knowledge data stored in the input interpretation knowledge data storage unit 22 and reading response knowledge data corresponding to the inferred response fragment from the response knowledge data storage unit 23.

Not only simple "input→response" pairs but also various forms may be present in a chat pattern which represents a chain relationship between an input and a response. An actual example of a chat pattern form will be described later.

The inference engine unit 21 may independently allow chatting between a plurality of general user terminal devices 7 to be performed in parallel (concurrently). In other words, the inference engine unit 21 may allow conversations in a plurality of chat rooms to be simultaneously performed in parallel.

The inference engine unit 21 may include a database for accumulating and storing all records of chats exchanged with the general user terminal device 7. This database stores all of text data transmitted from the side of the general user terminal device 7 to the side of the inference engine unit 21 and text data transmitted from the side of the inference engine unit 21 to the side of the general user terminal device 7 when chatting is performed using only text. When chats include multimodal data in addition to text data (cases in which chats include audio data, still image data, moving image data and other data, for example), the entire multimodal data is stored in the database in the inference engine unit 21. The database of the inference engine unit 21 may be provided in a device outside the automatic response server device 2.

In this manner, the automatic response server device 2 may use data stored in a database as an analysis target as big data.

The input interpretation knowledge data storage unit 22 stores knowledge data to be used by artificial intelligence included in the inference engine unit 21. An example of knowledge data is the aforementioned parameter value group θ.

In other words, knowledge data stored in the input interpretation knowledge data storage unit 22 is a parameter value group for inferring an optimal response fragment in a set of response fragments corresponding to input text transferred from the general user terminal device 7.

The input interpretation knowledge data storage unit 22 stores input interpretation knowledge data transmitted from an input interpretation knowledge data transmission unit 35 of the member terminal device 3.

The response knowledge data storage unit 23 stores data of response fragments. For example, data of a response fragment may include information for uniquely identifying the response fragment, response text (which may include a variable) and a method for resolving a variable when the response text includes the variable.

The response knowledge data storage unit 23 stores response knowledge data transmitted from a response knowledge data transmission unit 33 of the member terminal device 3.

A specific example of a chat pattern which is an origin of knowledge data (input interpretation knowledge data and response knowledge data) will be described later with reference to FIGS. 2 to 7.

The input interpretation knowledge data acquisition unit 24 acquires input interpretation knowledge data from the member terminal device 3 and writes the input interpretation knowledge data to the input interpretation knowledge data storage unit 22.

The response knowledge data acquisition unit 25 acquires response knowledge data from the member terminal device 3 and writes the response knowledge data to the response knowledge data storage unit 23.

Details such as a process at the side of the member terminal device 3, an update (writing) timing of knowledge data and a chat pattern, and the like will be described later.

The prototype database server device 4 shown in FIG. 1 includes a prototype storage unit 41 and a field tree management unit 42.

The prototype storage unit 41 stores prototype data. Here, a prototype is data which is a prototype of chat patterns. A prototype is sample data having the same format as a chat pattern. A prototype is associated with a field identifier for identifying one field in a field tree managed by the field tree management unit 42.

The field tree management unit 42 (field information management unit) stores and manages data of the field tree. The field tree includes labels representing fields and identifiers for uniquely identifying the fields. The field tree manages fields in a tree structure. An actual example of the field tree will be described later with reference to the drawings.

That is, the field tree management unit 42 stores and manages information on a field to which a prototype belongs.

Next, a chat pattern will be described. A chat pattern is a chain of chat fragments. The two types of an input fragment and a response fragment are present as chat fragments. The input fragment may be referred to simply as an "input" and the response fragment may be referred to simply as a "response." The input fragment is an input to the automatic response server device 2. The response fragment is a response output from the automatic response server device 2. That is, a chat pattern is data representing a pattern composed of an input to the automatic response server device 2 and a response from the automatic response server device 2 with respect to the input. That is, a chat pattern is data represented as a chain of input fragments and response fragments.

A chat pattern is data representing a pattern of chatting performed between the automatic response server device 2 and the general user terminal device 7. A chat pattern is a pattern representing a relationship between an input to the automatic response server device 2 and a response from the automatic response server device 2. An input included in a chat pattern may be associated with a characteristic word group for representing a characteristic of the input.

A chat pattern may be represented as data in an appropriate format. As an example, a chat pattern may be represented in extensible markup language (XML).

Figure 2A:
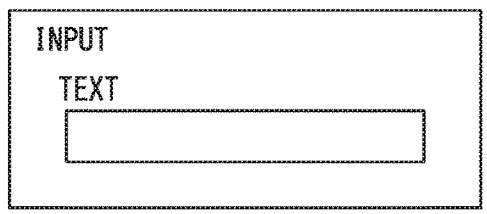
FIG. 2A is a schematic diagram showing an example of a configuration of a chat fragment (input fragment) in the present embodiment.
Figure 2B:
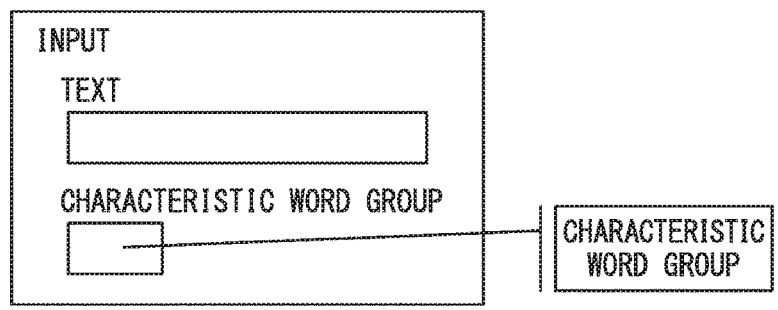
FIG. 2B is a schematic diagram showing an example of a configuration of a chat fragment (input fragment) in the present embodiment.
Figure 2C:
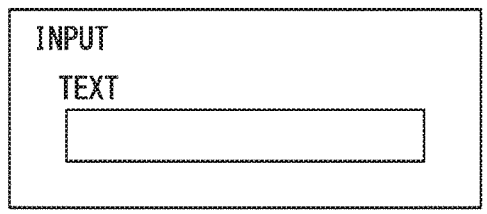
FIG. 2C is a schematic diagram showing an example of a configuration of a chat fragment (response fragment) in the present embodiment.
Figure 2D:
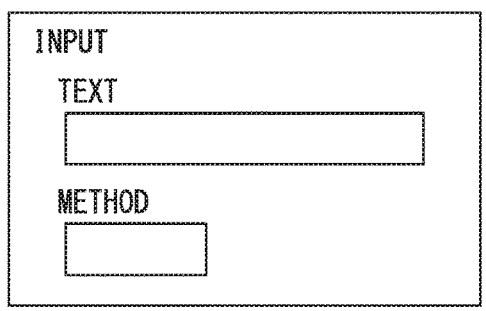
FIG. 2D is a schematic diagram showing an example of a configuration of a chat fragment (response fragment) in the present embodiment.

FIG. 2A to FIG. 2D are schematic diagrams showing configurations of chat fragments. FIG. 2A and FIG. 2B show examples of configurations of input fragments. FIG. 2C and FIG. 2D show examples of configurations of response fragments.

FIG. 2A shows an example of an input fragment. As shown, the input fragment of FIG. 2A includes information on text. This text corresponds to text input from the side of the general user terminal device 7 in chatting.

FIG. 2B shows another example of an input fragment. As shown, the input fragment of FIG. 2B includes reference information for a characteristic word group in addition to information on text. That is, the input fragment may be associated with the characteristic word group. The characteristic word group is a group of a single word or a plurality of words which characterizes the input fragment.

FIG. 2C shows an example of a response fragment. As shown, the response fragment of FIG. 2C includes information on text. This text corresponds to text output from the inference engine unit 21 of the automatic response server device 2 to the general user terminal device 7 in chatting.

FIG. 2D shows another example of a response fragment. As shown, the response fragment of FIG. 2D includes a method in addition to information on text. The method is a procedure (or a function) for acquiring information from the outside (e.g., an external database). When a response text includes a variable, a method corresponding to the variable may be defined. Data acquired by the method from the outside is embedded in the text as an actual value of the variable. As a specific example, when output text is "The balance of your account is <X> yen" (here, <X> is a variable), a method corresponding to the variable <X> acquires a value of <X> using appropriate conditions (e.g., a condition of the account number of the user, and the like) with reference to a predetermined account management database. For example, when the value of <X> is 1,000,000, the variable in the aforementioned output text may be replaced and thus the output text may be converted into text "The balance of your account is 1,000,000 yen."

In FIGS. 3 to 7, various examples of a manner of connecting chat fragments are shown.

Figure 3:
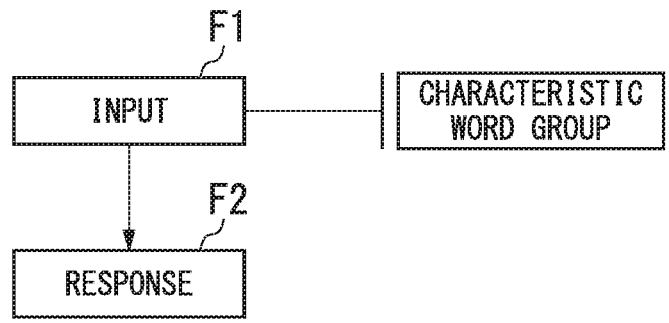
FIG. 3 is a schematic diagram showing a first example of a chat pattern used in the present embodiment.

FIG. 3 is a schematic diagram showing a first example of a chat pattern. The first example is a chat pattern composed of one input F1 and one response F2. The input F1 is associated with a characteristic word group. In this example, when there is an input from the general user terminal device 7 which corresponds to the input F1, the automatic response server device 2 acquires the input F1 and outputs the response F2 as a response to the input F1. The response F2 is delivered to the general user terminal device 7.

Text data input from the general user terminal device 7 is inferred as data corresponding to the input F1 according to characteristics represented by the characteristic word group correlated to the input F1.

Figure 4:
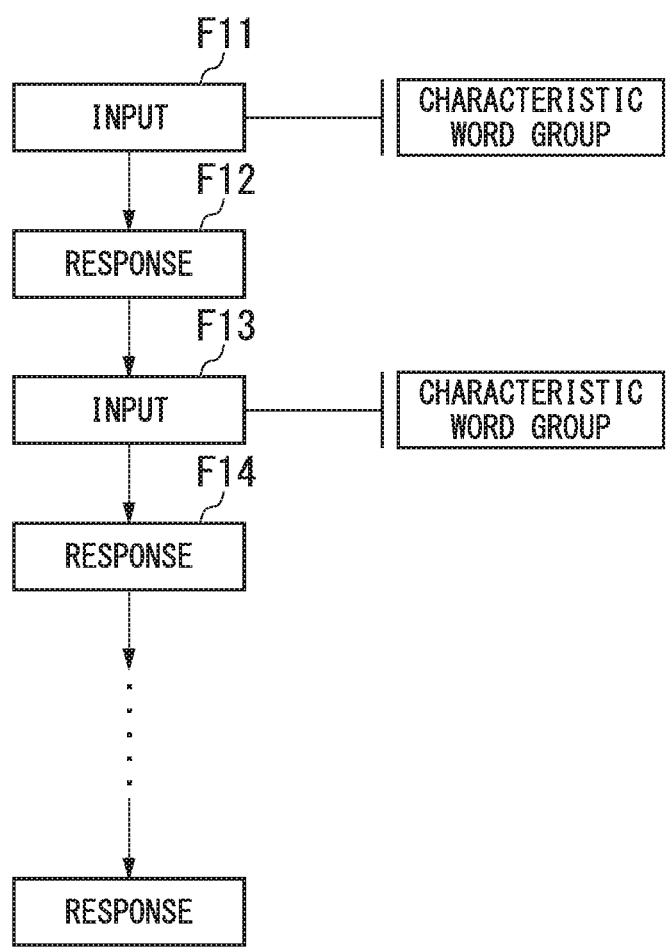
FIG. 4 is a schematic diagram showing a second example of a chat pattern used in the present embodiment.

FIG. 4 is a schematic diagram showing a second example of a chat pattern. The second example is a chat pattern in which two or more pairs of an input and a response are continuous. That is, in this chat pattern, the automatic response server device 2 acquires an input F11 and outputs a response F12 as a response to the input F11. Further, the automatic response server device 2 acquires an input F13 and outputs a response F14 as a response to the input F13. This continues in the following. In this chat pattern, the inputs F11 and F13 are associated with characteristic word groups.

Figure 5:
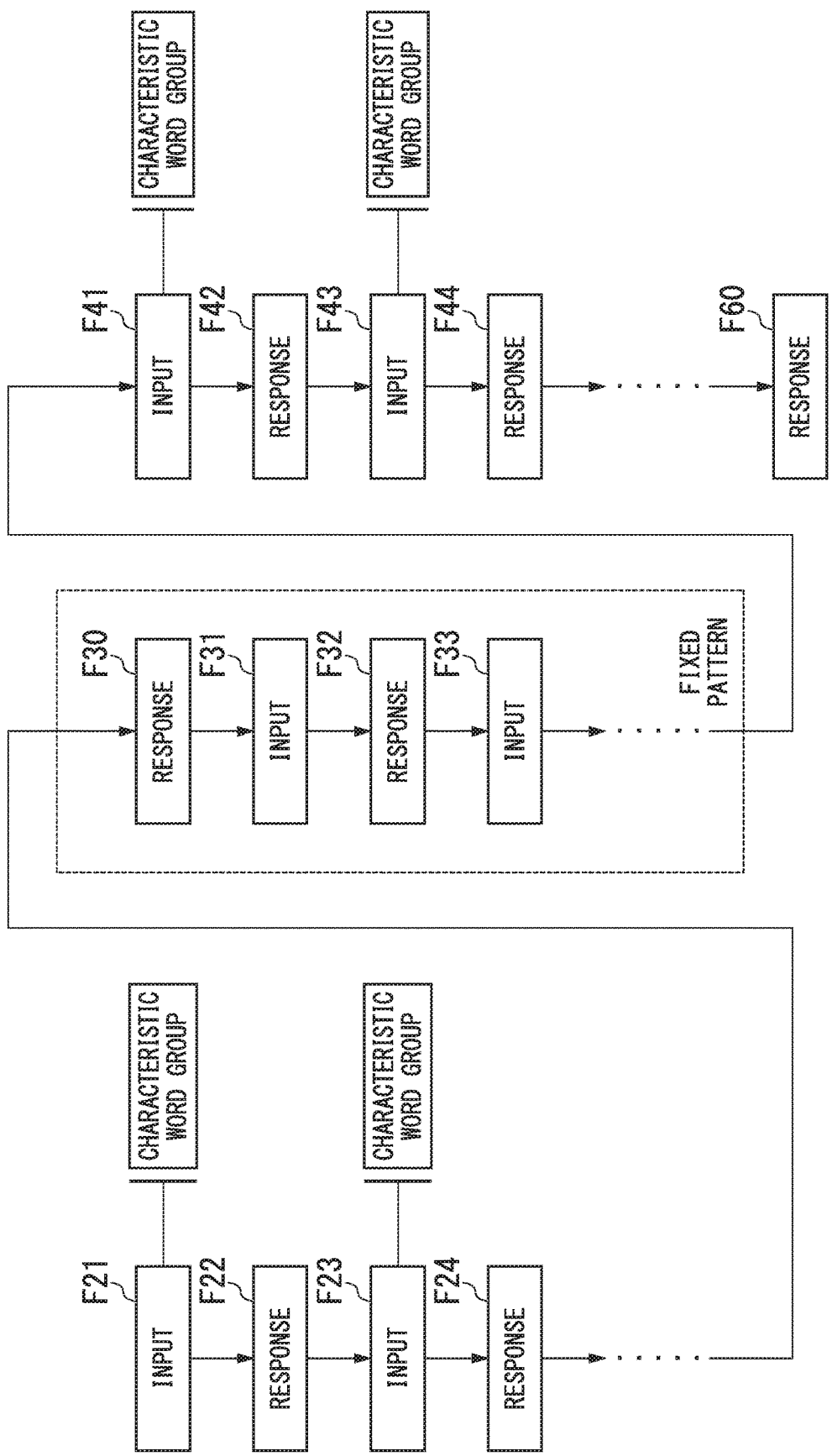
FIG. 5 is a schematic diagram showing a third example of a chat pattern used in the present embodiment.

FIG. 5 is a schematic diagram showing a third example of a chat pattern. The third example is a pattern which starts with an input F21 and ends with a response F60 and includes a fixed pattern from a response F30 in the middle thereof. A flow sequence in a chat is fixed in the fixed pattern in the middle of the pattern. That is, characteristic word groups are not associated with inputs included in the fixed pattern. For example, since a characteristic word group is not associated with an input F31, it is not determined that any input text corresponds to the input F31. In addition, the state of the input F31 is reached only after the automatic response server device 2 outputs a response F30. The same as the input F31 applies to an input F33. That is, chatting performed between the automatic response server device 2 and the general user terminal device 7 does not flow into the middle of the fixed pattern. Such a fixed pattern may be used for the automatic response server device 2 to obtain a sequence of information through a plurality of exchanges with the general user terminal device 7. Specifically, the fixed pattern may be used for the automatic response server device 2 to acquire information from the general user terminal device 7 according to a fixed scenario. As an example, such a fixed pattern may be used when a store which accepts an order for commodities obtains the name of an orderer, the address of the orderer, the telephone number of the orderer, a number for identifying the ordered commodities and the number of ordered commodities through a series of exchanges in chats.

Figure 6:
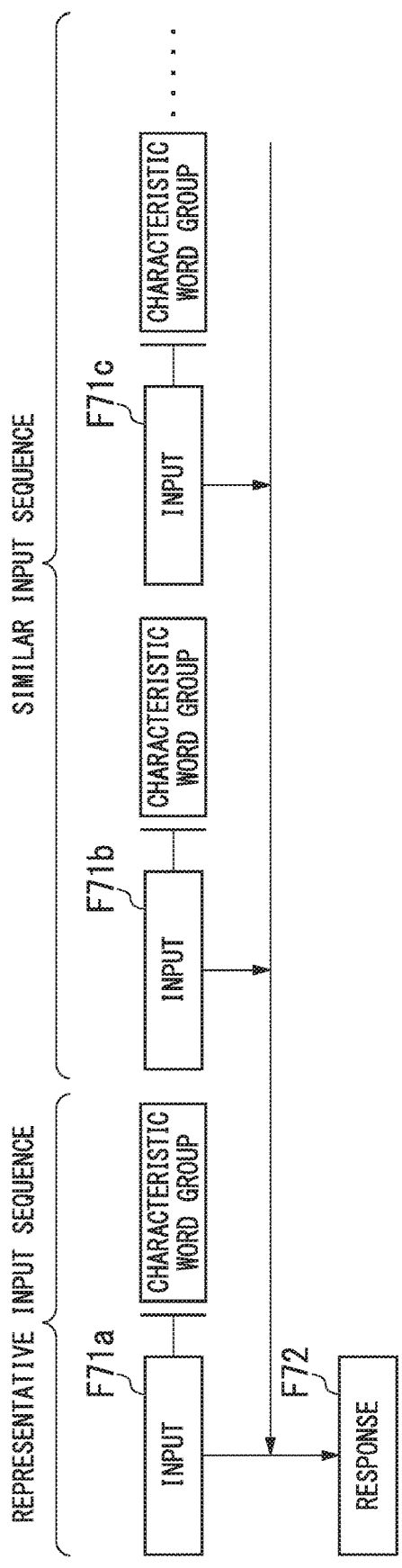
FIG. 6 is a schematic diagram showing a fourth example of a chat pattern used in the present embodiment.

FIG. 6 is a schematic diagram showing a fourth example of a chat pattern. The fourth example includes a pattern in which a sequence from a representative input and a sequence from similar inputs are merged together into a common response. Although inputs F71a, F71b and F71c (continuous in the following) are the same in that they are inputs connected to a response F72, they are associated with different characteristic word groups. The response system 1 of the present embodiment treats the input F71a among these inputs as a representative input.

Among the inputs, inputs (F71b, F71c, . . . ) other than the representative input are similar inputs. Such a chat pattern may be used in order to handle a plurality of surface layers in input in a certain context. As an example, when it is intended that the automatic response server device 2 will perform exchange for opening a new ordinary savings account in bank services, the following two pieces of input text may be treated as a representative input and a similar input. That is, "I want to open an account" is regarded as a representative input (input F71a) and "I want to make a bankbook" is regarded as a similar input (input F71b). Characteristic word groups may be respectively correlated to the inputs and thus they may be considerably different from each other.

Figure 7:
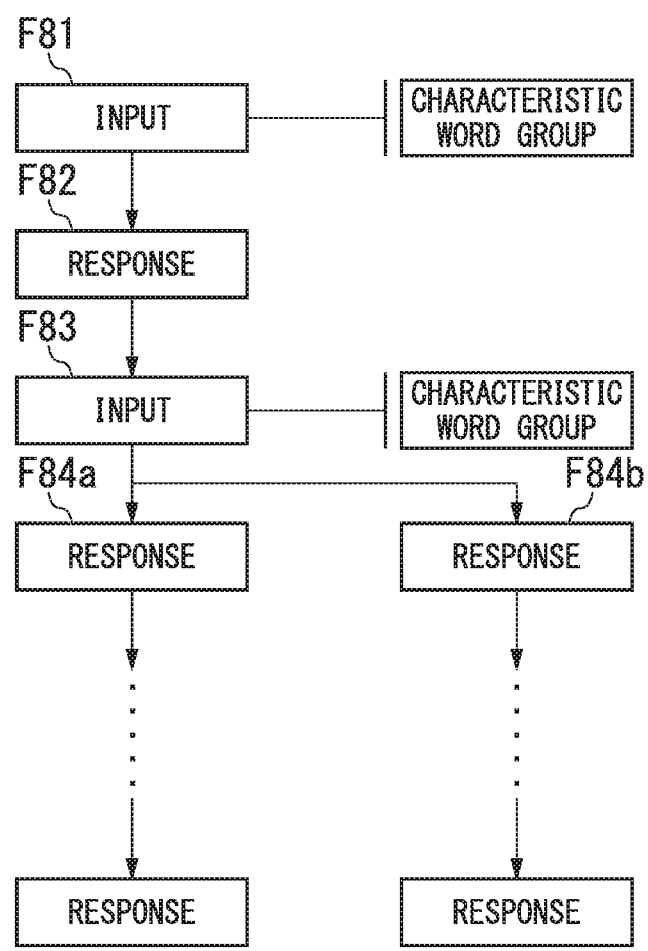
FIG. 7 is a schematic diagram showing a fifth example of a chat pattern used in the present embodiment.

FIG. 7 is a schematic diagram showing a fifth example of a chat pattern. The fifth example includes a pattern in which responses branch according to the contents of an input. As shown, in this chat pattern, inputs continue in such a manner that input F81→input F82→input F83. Further, branching to a response F84a or a response F84b according to the contents of the input F83 (actual input text) is possible. Specifically, a rule for input text may be described in the chat pattern. In addition, different responses may be described according to conditions in the rule. As an example, when a service with respect to a fixed deposit account in bank services is intended to be realized by the automatic response server device 2, a response of the automatic response server device 2 may need to be changed depending on whether to open a new fixed deposit or to cancel an existing fixed deposit. In such a case, the chat pattern shown as the fifth example may be used.

A chat pattern may be configured by combining a plurality of patterns illustrated in FIGS. 3 to 7. A chat pattern including the fixed pattern shown in FIG. 5 and the branch shown in FIG. 7 may be configured. The same applies to other combinations.

A created chat pattern is represented as appropriate data and stored in the response knowledge data storage unit 23 in the automatic response server device 2. A chat pattern includes a chain of inputs and responses and may also include a branch of a flow (FIG. 7) or integration of flows (FIG. 6). An input is associated with data of a characteristic word group. Although data of chat patterns having such properties may be represented in XML, for example, the data representation form is not particularly limited.

Next, a field tree will be described.

Figure 8:
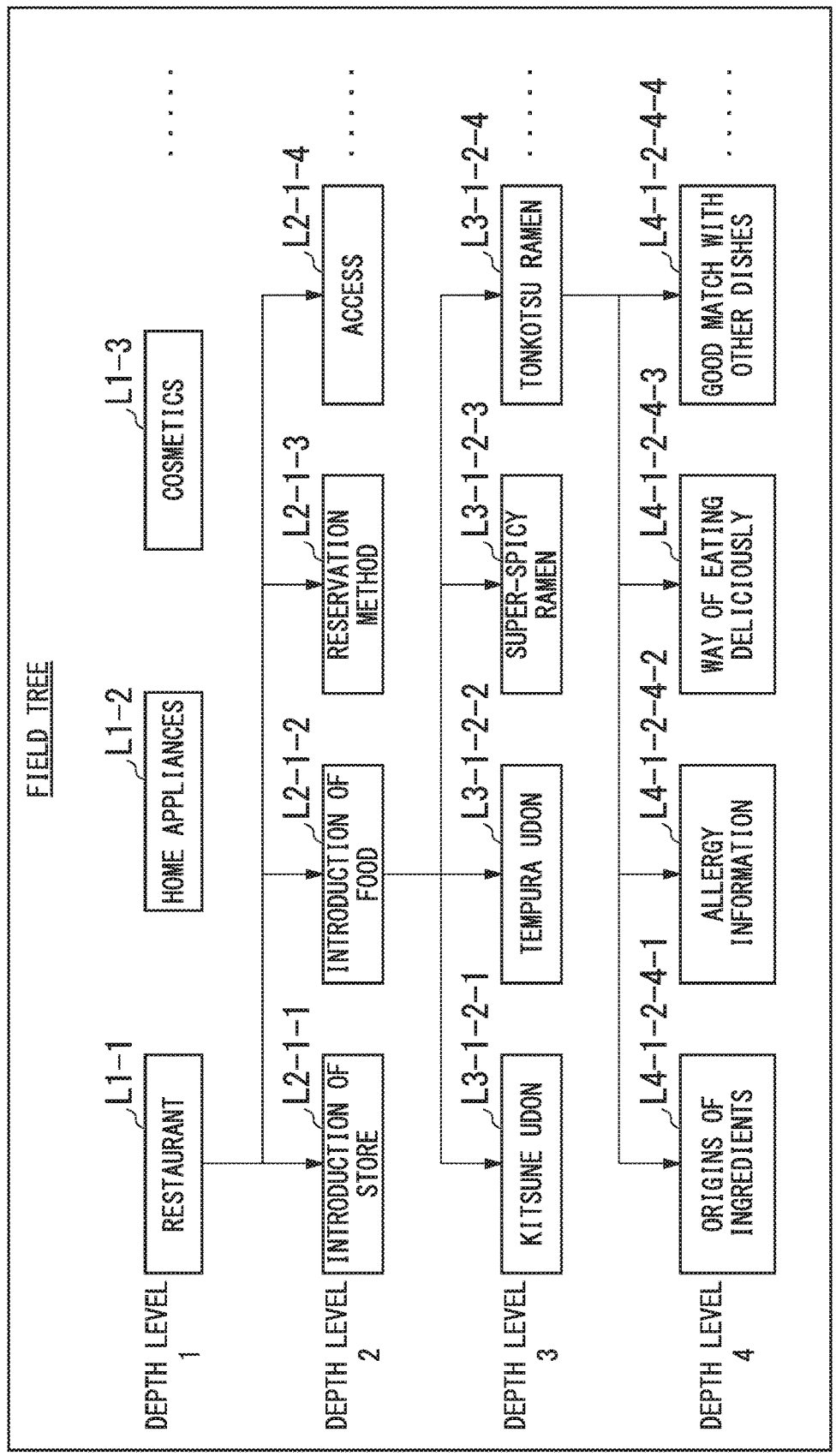
FIG. 8 is a schematic diagram showing an example of a field tree used in the present embodiment.

FIG. 8 is a schematic diagram showing an example of a field tree. As shown, the field tree has a tree structure having multiple layers (4 layers in the shown example). Each node of the field tree corresponds to a field of chat. When viewed from a certain node, an upper node (parent node or the like) corresponds to a superordinate concept of a field and a lower node (child node or the like) corresponds to a subordinate concept of the field.

In the shown example of the field tree, the uppermost layer (depth level 1) includes nodes of fields such as "Restaurant," "Home appliances" and "Cosmetics." The next layer (depth level 2) includes nodes of fields such as "Store introduction," "Food introduction," "Reservation method" and "Access" as child nodes of "Restaurant" among the nodes of depth level 1. The next layer (depth level 3) includes nodes of fields such as "Kitsune udon," "Tempura udon," "super-spicy ramen" and "Tonkotsu ramen" as child nodes of "Food introduction" among the nodes of depth level 2. The next layer (depth level 4) includes nodes of fields such as "Origins of ingredients," "Allergy information," "Way of eating deliciously" and "Good match with other dishes" as child nodes of "Tonkotsu ramen" among the nodes of depth level 3.

In the shown example of the field tree, business types are classified in depth level 1. A classification tree according to such business types is provided in depth level 2 and lower.

Each node included in the field tree is assigned an identifier for uniquely identifying the node.

In the prototype database server device 4, prototypes of chat patterns stored in the prototype storage unit 41 are associated with nodes of the aforementioned classification tree and stored. Accordingly, a member who operates the member terminal device 3 is able to trace prototypes of chat patterns from the classification tree when the member searches for a prototype of a chat pattern. That is, the member easily finds a desired prototype of a chat pattern.

Although the maximum depth of the field tree is 4 in FIG. 8, a maximum depth level is arbitrary. Although FIG. 8 shows an example in which the form of a connection between fields is a tree structure, fields may be connected in other forms. In any case, a prototype of a chat pattern stored in the prototype storage unit 41 may be associated with a specific field by assigning an identifier (which is referred to as a "field identifier") to one field (corresponding to one node in FIG. 8). Accordingly, members and the like may easily search for a chat pattern prototype.

Next, the member terminal device 3 will be described in detail.

Figure 9:
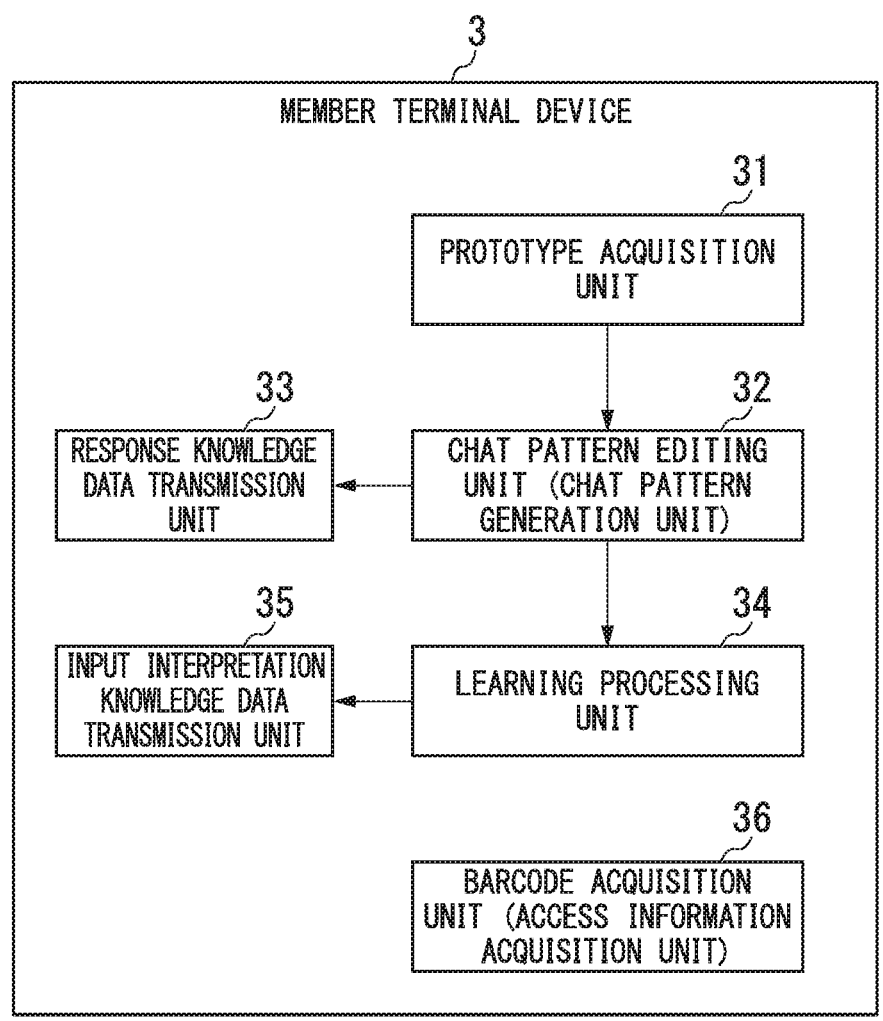
FIG. 9 is a block diagram showing a schematic functional configuration of a member terminal device 3 according to the present embodiment.

FIG. 9 is a block diagram showing a schematic functional configuration of the member terminal device 3. As shown, the member terminal device 3 includes a prototype acquisition unit 31, a chat pattern editing unit 32, the response knowledge data transmission unit 33, a learning processing unit 34, an input interpretation knowledge data transmission unit 35 and a barcode acquisition unit 36. The function of each unit is as follows.

The prototype acquisition unit 31 acquires prototype data of chat patterns from the prototype database server device 4. The prototype data of chat patterns is created in advance by an operator of the prototype database server device 4. A user of the member terminal device 3 may select appropriate prototype data matching their business and download the selected prototype data from the prototype database server device 4.

For example, the user of the member terminal device 3 may select and download a prototype data matching a business type to which their business belongs. The user of the member terminal device 3 may create chat pattern data by adding and embedding necessary information to/in a prototype downloaded from the prototype database server device 4. Creation of chat pattern data is performed by the following chat pattern editing unit 32.

The chat pattern editing unit 32 (chat pattern generation unit) has a function of editing a chat pattern. The chat pattern editing unit 32 may newly generate, correct or selectively delete chat pattern data according to an operation of an operator (member). That is, it is possible to create all of new chat patterns according to the chat pattern editing unit 32. The chat pattern editing unit 32 may create a chat pattern by adjusting a prototype acquired by the prototype acquisition unit 31 from the prototype database server device 4. It is also possible to modify existing (previously registered) chat patterns according to the chat pattern editing unit 32.

When the chat pattern editing unit 32 generates a chat pattern on the basis of a prototype, a field identifier associated with a former prototype is taken over to the generated chat pattern. That is, there are cases in which a field identifier may be associated with a chat pattern.

The chat pattern editing unit 32 stores a chat pattern obtained as a result of an editing process inside thereof. The chat pattern editing unit 32 transfers a chat pattern obtained as a result of an editing process to the response knowledge data transmission unit 33 and the learning processing unit 34.

That is, the chat pattern editing unit 32 generates information on a chat pattern which is a pattern of an input fragment which is an input to the above-described automatic response server device and a response fragment which is a response from the automatic response server device to the input fragment in chatting. The chat pattern editing unit 32 may generate information on characteristics (e.g., characteristic word group) corresponding to input fragments (input text).

The response knowledge data transmission unit 33 transmits response knowledge data (data of response fragments) included in a chat pattern created by the chat pattern editing unit 32 to the automatic response server device 2. In other words, the response knowledge data transmission unit 33 transmits response knowledge data based on response fragments included in a chat pattern generated by the chat pattern editing unit 32 to the automatic response server device 2.

The learning processing unit 34 performs a learning process on the basis of a chat pattern created by the chat pattern editing unit 32 and outputs input interpretation knowledge data which is a result of the learning process. Specifically, the learning processing unit 34 performs a learning process as follows.

In the automatic response server device 2, a process of identifying input text as a specific input in a chat pattern is performed according to the aforementioned expression (1) as described above.

Accordingly, the learning processing unit 34 uses a set of pairs of pieces of input text and responses (values of $RESP_i$ in expression (1)) corresponding to the pieces of input text as data for learning. For example, the data for learning may be provided by a member who operates the member terminal device 3. The member may input input text example, for example, when the chat pattern editing unit 32 edits a chat pattern. The aforementioned set of pairs is data of positive examples for learning.

Data of negative examples for learning may be prepared appropriately.

When the inference engine unit 21 uses a neural network, the learning processing unit 34 optimizes the parameter value group θ using the aforementioned data for learning through an error backpropagation method. When the inference engine unit 21 uses a method other than the neural network, the learning processing unit 34 appropriately performs a learning process using a learning method suitable for the method of the inference engine unit 21.

As described above, the learning processing unit 34 acquires and outputs input interpretation knowledge data (e.g., parameter value group θ).

That is, the learning processing unit 34 performs a process of learning a relationship between input text input to the automatic response server device 2 and a response corresponding to the input text on the basis of a chat pattern generated by the chat pattern editing unit 32 and input text example and outputs input interpretation knowledge data acquired as a result of the learning process. In other words, the learning processing unit 34 performs a process of learning a relationship between input text corresponding to input fragments and response fragments on the basis of a chat pattern generated by the chat pattern editing unit 32 and outputs input interpretation knowledge data acquired as a result of the learning process.

The input interpretation knowledge data transmission unit 35 transmits input interpretation knowledge data obtained and output by the learning processing unit 34 to the automatic response server device 2. That is, the input interpretation knowledge data transmission unit 35 transmits input interpretation knowledge data output from the learning processing unit 34 to the automatic response server device 2. The input interpretation knowledge data includes information on the parameter value group θ in the above-described expression (1).

The response knowledge data transmission unit 33 and the input interpretation knowledge data transmission unit 35 synchronize with each other to transmit data to the automatic response server device 2. Accordingly, response knowledge data transmitted by the response knowledge data transmission unit 33 matches input interpretation knowledge data transmitted by the input interpretation knowledge data transmission unit 35. That is, specifically, the learning processing unit 34 performs a learning process at a timing at which the chat pattern editing unit 32 ends a process of editing one section. Accordingly, response knowledge data saved to be transmitted by the response knowledge data transmission unit 33 and input interpretation knowledge data saved to be transmitted by the input interpretation knowledge data transmission unit 35 match each other.

In the automatic response server device 2, response knowledge data and input interpretation knowledge data are updated in such a manner that they match each other.

The barcode acquisition unit 36 (which is also referred to as an access information generation unit) generates a barcode which is access information used for the general user terminal device 7 to access a chat room of a corresponding member (member who operates the member terminal device 3). The access information is typically information of a universal resource locator (URL) of a service provided by the automatic response server device 2. The barcode acquisition unit 36 may generate, as access information, a two-dimensional code and other code information instead of a barcode. In all cases, it is possible to access the chat room of the corresponding member by using the access information generated by the barcode acquisition unit 36.

Particularly, when a learning process performed by the learning processing unit 34 is completed, the barcode acquisition unit 36 generates barcode information and the like (access information) for accessing a chat in which the result of the learning process is reflected.

The access information generated by the barcode acquisition unit 36 may include information for identifying a member, for example. Here, the general user terminal device 7 which has accessed the automatic response server device 2 using the access information is connected to the chat room of the member.

The access information generated by the barcode acquisition unit 36 includes information on a field identifier as necessary. Here, the general user terminal device 7 which has accessed the automatic response server device 2 using the access information is connected to a chat pattern matching the field identifier in the corresponding member. The access information generated by the barcode acquisition unit 36 includes information for identifying a specific chat pattern. Here, the general user terminal device 7 which has accessed the automatic response server device 2 using the access information is connected to a chat pattern matching the identification information in the corresponding member.

The barcode acquisition unit 36 may generate access information simply through a process of its own according to a predetermined rule. The barcode acquisition unit 36 may generate access information in such a manner that at least a part of the access information is acquired from the automatic response server device 2. The barcode acquisition unit 36 may acquire the access information itself or all information necessary to generate the access information from the automatic response server device 2. As an example, the barcode acquisition unit 36 may acquire image data itself of a finished barcode from the automatic response server device 2 and output the image data. The automatic response server device 2 appropriately provides necessary information to the barcode acquisition unit 36.

For example, a user of the member terminal device 3 may appropriately print access information output from the barcode acquisition unit 36 on a paper medium, and the like such that customers and the like of the business of the user can access chats. For example, the user of the member terminal device 3 may post the access information (a barcode, a two-dimensional code or the like) in a store, include the access information in a food menu and the like in the case of a restaurant, or distribute the access information as handouts.

In typical cases, knowledge data and a chat pattern are updated as follows. That is, a member who operates the member terminal device 3 corrects existing chat patterns on the basis of realization and the like obtained through daily business. Alternatively, the member who operates the member terminal device 3 may generate and register a new chat pattern in order to provide a new service as a business. A chat pattern updated in this manner is reflected in the automatic response server device 2 at a predetermined timing.

A human-machine interface in the response system 1 will be described.

FIG. 10 is a schematic diagram showing an example of a screen for registering a chat pattern in the member terminal device 3.

As shown, the screen is realized using a graphical user interface. As shown, this chat pattern registration screen has columns for inputting a title, a representative input, and a plurality of similar inputs. The chat pattern registration screen has an "increase" button and three buttons for selecting a division. In the shown example, a "Shinkansen" button as division 1, a "subway" button as division 2 and a "bus" button as division 3 are present. The chat pattern registration screen has a column for inputting a member response. The chat pattern registration screen has a "download" button, a "register" button, a "delete" button and a "save" button.

In the screen of the present example, four inputs (i.e., one representative input and three similar inputs) may be correlated to a single common response (member response). That is, the chat pattern registration screen shown in FIG. 10 is suitable for editing the chat pattern (in which one representative input sequence and a plurality of similar input sequences correspond to one response) shown in FIG. 6. A screen for setting input fragments and response fragments may also be appropriately provided for chat patterns in other forms.

The title is provided to an individual chat pattern. Any character string may be used as a title.

The representative input corresponds to a representative input (refer to FIG. 6) from inputs included in this chat pattern.

The similar inputs correspond to similar inputs (refer to FIG. 6) corresponding to the representative input among inputs included in this chat pattern. In the shown example, three types of similar input may be written. It is possible to increase the number of columns for writing similar inputs by pressing the "increase" button.

The buttons of division 1 ("Shinkansen"), division 2 ("subway") and division 3 ("bus") are columns for designating a division to which this chat pattern belongs. Division 1, division 2 and division 3 correspond to nodes in a predetermined depth level (any of depth level 1, depth level 2, depth level 3 and depth level 4) in the field tree shown in FIG. 8. The user of the member terminal device 3 may press any division button in the chat pattern registration screen to edit a chat pattern belonging to the corresponding node. That is, a chat pattern registered from the chat pattern registration screen is registered as a chat pattern belonging to a node (field) selected according to button depression. That is, a registered chat pattern may be associated with a specific field identifier.

The column for a member response is a column for setting text of a response corresponding to a representative input or a similar input.

The "register" button is a button for causing a process of registering a chat pattern created on this screen to be performed. When the "register" button is pressed, a chat pattern created on this screen is registered in a storage means in the member terminal device 3. The chat pattern is transferred from the chat pattern editing unit 32 to the response knowledge data transmission unit 33 and the learning processing unit 34. The response knowledge data transmission unit 33 sequentially receives a single or a plurality of pieces of response knowledge data from the chat pattern editing unit 32 and transmits the response knowledge data to the automatic response server device 2 when a trigger is separately applied. The learning processing unit 34 sequentially receives a single or a plurality of chat patterns from the chat pattern editing unit 32 and performs a learning process based on the chat pattern when a trigger is separately applied.

The "delete" button is a button for causing a process of deleting a chat pattern open on this screen to be performed. When the "delete" button is pressed, a chat pattern open on this screen is deleted in the member terminal device 3. Information representing that the chat pattern has been deleted is transferred from the chat pattern editing unit 32 to the response knowledge data transmission unit 33 and the learning processing unit 34. The response knowledge data transmission unit 33 receives information about the deleted chat pattern from the chat pattern editing unit 32. In addition, the response knowledge data transmission unit 33 transmits information representing that response knowledge data included in the deleted chat pattern needs to be deleted to the automatic response server device 2 when a trigger is separately applied. The learning processing unit 34 receives the information about the deleted chat pattern from the chat pattern editing unit 32. In addition, the learning processing unit 34 performs a learning process anew in a state in which a deleted chat pattern is not present when a trigger is separately applied.

The "save" button is a button for causing a process of temporarily saving a chat pattern edited on this screen to be performed. When the "save" button is pressed, a chat pattern open on this screen is saved in the storage means in the member terminal device 3. However, information on response fragments included in the chat pattern, that is, response knowledge data is not transmitted to the automatic response server device 2 simply by saving the chat pattern using the "save" button. A learning process based on the chat pattern is not performed simply by saving the chat pattern using the "save" button.

The user of the member terminal device 3 may call and re-edit the chat pattern saved using the "save" button later. The user of the member terminal device 3 may register the re-edited chat pattern. The user of the member terminal device 3 may delete the temporarily stored chat pattern.

The "download" button is a button for causing a process of downloading a prototype of a chat pattern which satisfies a specific condition from the prototype database server device 4 to be performed. The user of the member terminal device 3 may edit and register or save a chat pattern using a chat pattern prototype downloaded from the prototype database server device 4.

A characteristic word group corresponding to an input fragment in a chat pattern is automatically extracted from the text of each input (representative input or similar input).

Alternatively, the user of the member terminal device 3 may set a characteristic word group corresponding to an input fragment through a manual operation using a screen which is not shown.

Next, a procedure for editing and generating a chat pattern will be described.

The state shown in FIG. 10 is a state in which the user of the member terminal device 3 has appropriately designated a division and then downloaded a chat pattern prototype from the prototype database server device 4 by pressing the "download" button and input text to the column for the member response. In the shown example, a case in which the user of the member terminal device 3 has selected "Shinkansen" of division 1 is shown. In this example, a chat pattern prototype having a title of "Method of going there" is acquired from the prototype database server device 4. Text "Please let me know how to get there" is set as a representative input. Text "How do I get there?," text "How can I get to store?" and text "Let me know the way of going by means of transportation" are set as similar inputs. These pieces of text of the representative input and the similar inputs have been written in advance in the prototype database server device 4 by the operator of the prototype database server device 4 as prototype data. The user of the member terminal device 3 may use the pieces of text of the representative input and the similar inputs as they are or edit and modify the pieces of text.

In the state shown in FIG. 10, the user of the member terminal device 3 has set a text response suitable for their business and corresponding to the inputs (representative input and similar inputs) in the column for the member response (has input the text response through a character input means such as a keyboard). Specifically, text "Exit through the Yaesu central gate of Shinkansen Tokyo station. Leave the exit and walk about 100 m to the left. If you walk to the right about 30 m from the point where you will see a kiosk, you can see a convenience store. The store is on the third floor of that building." has been set in the column for the member response by the user of the member terminal device 3. That is, the user of the member terminal device 3 may set response text suitable for their business according to the contents (representative input and similar inputs) of a prototype created by the operator of the prototype database server device 4.

As described above, the user of the member terminal device 3 may open the screen of FIG. 10 and set input fragments and response fragments of a chat pattern. Association between input fragments and response fragments in one chat pattern is also performed on the screen. As described above, the user of the member terminal device 3 may register various patterns shown in FIGS. 3 to 7 by appropriately associating input fragments with response fragments.

The user of the member terminal device 3 may edit and register a synonym dictionary for execution of chats and a learning process.

FIG. 11 is a schematic diagram showing an example of a screen for editing and registering a synonym dictionary in the member terminal device 3. As shown, this synonym directional registration screen has a column for inputting a search word and a "search" button. The synonym directional registration screen has a plurality of sets of a column for inputting a pair of a keyword and a synonym, a "register" button and a "delete" button. In the shown example, three sets are displayed but the number of sets may be arbitrarily changed. Below this screen, columns for adding keywords (a column for adding a keyword and a column for a synonym thereof) are provided. Further, a "register" button, a "delete" button and a "save" button provided with respect to keyword addition are provided below the screen.

The column for a search word is a column for setting a search word for searching for a keyword. The "search" button is a button through which a trigger for executing searching of a keyword using the search word is applied. When this searching is executed, the corresponding keyword and a list of synonyms thereof are displayed such that they can be edited.

In the example of the state of the shown screen, "business hours" are set as search words.

The columns for keywords are columns for inputting words which are keys for synonym registration. The columns for synonyms are columns for inputting a single or a plurality of synonyms associated with keywords. That is, in the first row of the shown example, synonyms "start time," "time of opening" and "open time" correspond to a keyword "opening time." In a column for a synonym, a plurality of synonyms may be set using a slash. In the second row, synonyms "business start time," "time of business start" and "start of business" correspond to a keyword "business start." In the third row, synonyms "last order," "final order" and "final orders" correspond to a keyword "last orders." For example, there may be cases in which a typographical error (erroneous input) in chat text can be interpreted as an originally intended word by registering homonyms of keywords as synonyms.

A weight may be set for a pair of a keyword and synonyms. The weight is a numerical value representing a weight of the corresponding set. For example, the weight may be a real number equal to or greater than 0.

The weight represents a degree to which a synonym in the corresponding set is used as a synonym of a keyword. When the value of the weight is high, a degree to which the weight is used instead of the keyword is regarded to be high. Conversely, when the value of the weight is low, a degree to which the weight is used instead of the keyword is regarded to be low.

The "register" button corresponding to a pair (row) of a keyword and synonyms is a button used as a trigger for registering the keyword and synonyms input to the row in a synonym dictionary.

Similarly, the "delete" button is a button used as a trigger for deleting the synonyms corresponding to the keyword from the synonym dictionary.

To register a new keyword, which is not registered in the synonym dictionary, in the synonym dictionary, a user interface for appropriately setting words in the column for adding a keyword and the column for a synonym below the screen and pressing the "register" button is provided.

Synonyms registered in the synonym dictionary are likely to be substituted for a keyword when the inference engine unit 21 processes input text in chatting. Whether the inference engine unit 21 actually uses the synonyms also depends on registered weights. Characteristic words may be extended (substituted) by using the synonym dictionary. It is possible to take into account variations in expression in input text and interpret the text by allowing substitution using the synonym dictionary. When substitution using synonyms is performed, substitution may be controlled such that it is able to be easily performed by appropriately setting the aforementioned weights.

Next, an example of a screen for chatting will be described.

Figure 12:
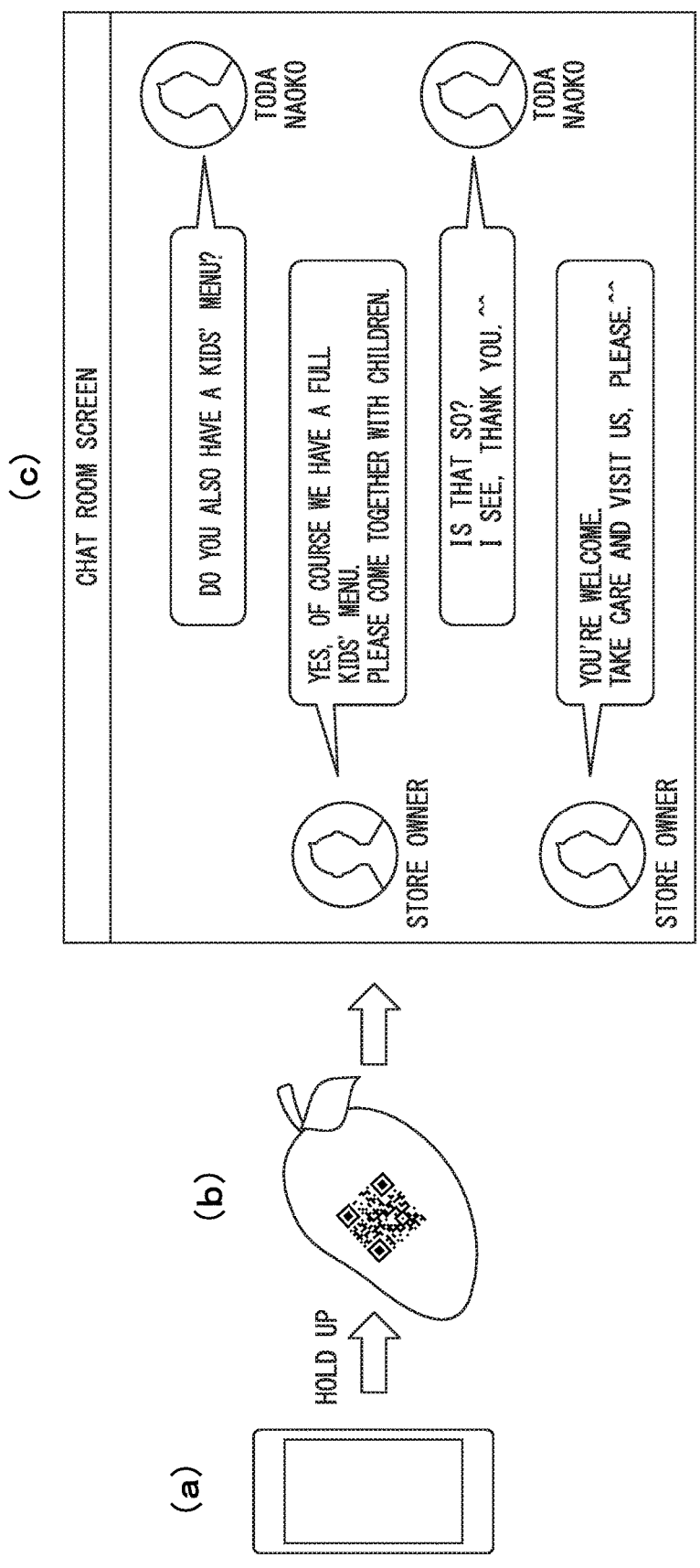
FIG. 12 is a schematic diagram showing an actual example of screen display of chats performed between a general user terminal device 7 and a virtual user in an automatic response server device 2 according to the present embodiment and also showing a flow through which the general user terminal device 7 accesses a specific chat service in a chat server device 5 by reading printed access information.

FIG. 12 is a schematic diagram showing an actual example of chatting performed between the general user terminal device 7 and a virtual user in the automatic response server device 2.

(a) in this figure shows an example of the external appearance (plan view) of the general user terminal device 7. (b) in this figure shows an example of the external appearance (perspective view) of an object (fruit) on which code information (access information) acquired by the barcode acquisition unit 36 of the member terminal device 3 is printed. The printed code information (access information) may be a barcode, a two-dimensional code, characters or information in other forms. For example, the printed code information may be optically read. (c) in this figure shows an example of a screen of a chat room displayed at the side of the general user terminal device 7.

Here, a procedure of accessing the chat server from the side of the general user terminal device 7 will be described with reference to FIG. 12.

(1) First, the member terminal device 3 which is not shown performs a learning process on the basis of a set chat pattern. In addition, the member terminal device 3 transmits response knowledge data and input interpretation knowledge data to the automatic response server device 2.

(2) The automatic response server device 2 stores the response knowledge data and the input interpretation knowledge data transmitted from the side of the member terminal device 3.

(3) The automatic response server device 2 transmits access information for accessing a chat service of a corresponding member or access information for accessing a chat service associated with a specific field identifier of the corresponding member to the member terminal device 3. With respect to the corresponding member, whether to access the chat service associated with the specific field identifier may be appropriately set, for example.

(4) The member terminal device 3 prints and outputs a two-dimensional code which is optically readable on the basis of the access information received from the automatic response server device 2. The two-dimensional code shown in FIG. 12(*b*) is an example thereof. The object on which the two-dimensional code has been printed may be placed in a store or the like, for example.

(5) The user of the general user terminal device 7 reads the two-dimensional code by holding up the general user terminal device 7 (specifically, a smartphone, a tablet terminal or the like, for example) shown in FIG. 12(*a*) to the two-dimensional code of FIG. 12(*b*).

(6) The general user terminal device 7 extracts information for accessing a chat service from the read two-dimensional code. Specifically, the general user terminal device 7 may extract URL information for accessing a service of a specific chat room, for example. In addition, the general user terminal device 7 accesses a server device indicated by the URL using a communication means. Specifically, the URL is information indicating an address of a specific service in the chat server device 5. In this manner, the general user terminal device 7 may access a chat room corresponding to a member store or corresponding to specific information in a member store.

The title of the window of the screen shown in FIG. 12(*c*) is displayed as "chat room screen."

In this screen, the right side (at which user "Toda Naoko" is written) is a user of the general user terminal device 7 and the left side (at which user "store owner" is written) is a virtual user in the automatic response server device 2. In the shown chat, first, the user of the general user terminal device 7 on the right side inputs "Do you also have a kids' menu?" The inference engine unit 21 of the automatic response server device 2 infers optimal response fragments on the basis of this input text.

For this inference, parameter values acquired in advance according to a learning process is used. The parameter values have been stored in the input interpretation knowledge data storage unit 22 of the automatic response server device 2. In addition, when optimal response fragments are designated, the inference engine unit 21 of the automatic response server device 2 returns a response according to the response fragments. Specifically, response text "Yes, of course we have a full kids' menu. Please come together with children" is returned by the automatic response server device 2 in this example. This response text arrives at the general user terminal device 7 via the chat server device 5 and is displayed on the screen thereof. Subsequently to the response text, the inference engine unit also infers optimal response fragments through the same process for text "Is that so? I see, thank you" which is an input from the general user terminal device 7 and outputs response text "You're welcome. Take care and visit us, please" as a result.

Another example (not shown) in the chat service is as follows. For an input "How much is the balance of the account?" from the general user terminal device 7, the inference engine unit 21 infers optimal response fragments and returns response text "Thank you for your inquiry. The present balance of your account is 10,000,000 yen" to the automatic response server device 2 as a result of inference. "10,000,000" which is the numerical value of the balance is the value of a variable included in response fragments in a corresponding chat pattern. A method designated in the response fragments acquires the balance of the bank account of the user of the general user terminal device 7 with reference to an account information database. The method substitutes the numerical value of the acquired balance for the value of the variable included in the response fragments.

An example of the flow of the whole process of the response system 1 is as follows.

First, a member performs membership registration through a homepage of an operator (hereinafter referred to as company A) of the automatic response server device 2 as step 1. When the member is acknowledged as a member, the member may access the prototype database server device 4 of the company A. The member personally downloads a corresponding prototype from a tree (field tree) for each industrial field from the prototype database server device 4 using the member terminal device 3.

Next, as step 2, the member writes a response (an answer announced to general users) according to the business thereof in accordance with a downloaded representative input (representative question) and similar inputs (similar questions). Accordingly, the member completes a chat pattern.

Subsequently, as step 3, the member executes a learning process (machine learning process) using the member terminal device 3. As a result of the learning process, the following two files are acquired.

(1) Input interpretation knowledge data: data including knowledge (parameters) representing a relationship between input text and a response (2) Response knowledge data: data of response fragments (answers) for the representative input and the similar inputs, input by the member Subsequently, as step 4, the aforementioned two pieces of data generated according to the learning process and the like are transmitted from the member terminal device 3 to the input interpretation knowledge data acquisition unit 24 and the response knowledge data acquisition unit 25 in the automatic response server device.

Next, as step 5, the automatic response server device 2 stores the input interpretation knowledge data and the response knowledge data received from the member terminal device 3 in the respective storage units.

Then, as step 6, the automatic response server device 2 transmits URL information (access information) for directly accessing a chat room associated with the data transmitted from the side of the member terminal device 3 to the member terminal device 3. For example, the access information may be a barcode or two-dimensional code information. The member terminal device 3 generates and outputs the access information at the side of the terminal thereof.

Subsequently, as step 7, the member prints out the access information (barcode or the like) from a place which is able to be seen easily by general users, such as a menu, a table or the like of a store. A general user can access the related chat room by simply holding up the general user terminal device 7 to the barcode at any time.

Next, as step 8, the general user terminal device 7 accesses the chat room and transmits input text. For example, the general user terminal device 7 may transmit text "How can I go?" as input text. The inference engine unit 21 of the automatic response server device 2 infers an optimal response on the basis of characteristics of the received input text (for example, a characteristic word group included in the input text may be a characteristic of the input text) and interpretation knowledge data. The input text "How can I go?" has a characteristic close to the characteristic of "how can I go?" which is one of the similar inputs of FIG. 10. The inference engine unit 21 generates response text with reference to response knowledge data on the basis of a response (response fragments) corresponding to the way of going and outputs the response text.

According to the flow of the above-described process, general users are able to make inquiries about details they want to know and obtain necessary answers through a process according to artificial intelligence.

Subsequently, as step 9, when inputs (questions) output by general users include an input to which the inference engine unit 21 cannot reply (when a likelihood of an inferred optimal response is lower than a predetermined threshold value, for example), the automatic response server device 2 informs the member terminal device 3 of the input through an alarm.

Next, as step 10, the member terminal device 3 resets a chat pattern through the chat pattern registration screen with respect to the input text for which the alarm has been received and appropriately re-executes the learning process as necessary. The result of the re-executed learning process is accumulated as knowledge data of the automatic response server device 2 according to the same process as described above. That is, it is possible to appropriately repeat the learning process to update knowledge data.

According to the present embodiment, medium or small-sized business operators, for example, can also construct a response system using artificial intelligence by including the member terminal device 3 without much investment. In addition, business operators can realize response systems highly tuned to the businesses thereof by arranging chat pattern data and the like using the member terminal device 3.

Since the member terminal device 3 can download data which is a prototype of a chat pattern from the prototype database server device 4, business operators can easily establish response systems suitable for business types of the businesses thereof.

According to the present embodiment, a chat pattern is registered in the member terminal device 3 and knowledge data is generated on the basis of the chat pattern according to a learning process in the member terminal device 3. Such a chat pattern and knowledge data are transmitted to the automatic response server device 2. The automatic response server device 2 updates the input interpretation knowledge data storage unit 22 and the response knowledge data storage unit 23 using data (input interpretation knowledge data and response knowledge data) received from the member terminal device 3. According to this configuration, the learning process is performed at the side of the member terminal device 3. That is, the automatic response server device 2 does not need to perform a learning process for generating knowledge data used by itself. For example, the member terminal device 3 may be realized by a PC, a tablet terminal, a smartphone and the like. That is, it is not necessary to allocate much computation resources in the automatic response server device 2 which need not perform a learning process. That is, the automatic response server device 2 may be constructed at relatively low cost. Accordingly, a computation for such a learning process may be performed using a reserve capacity of the member terminal devices 3 of members. As a result, the entire response system 1 may be constructed at low cost as a whole.

According to the present embodiment, the member terminal device 3 outputs access information (e.g., a barcode, a two-dimensional code or the like) for accessing a service of a specific chat room. The general user terminal device 7 may easily access a service of a desired chat room (in other words, a service of a chat room of a desired member) or a service of a chat room of a field (identified by a field identifier, for example) of specific information provided by a desired member by reading the access information using an optical reading device (reading means), for example.

Second Embodiment

Next, a second embodiment of the present invention will be described. Description of matters already described in the prior embodiment may be omitted below. Here, description will focus on characteristic matters of the present embodiment.

Figure 13:
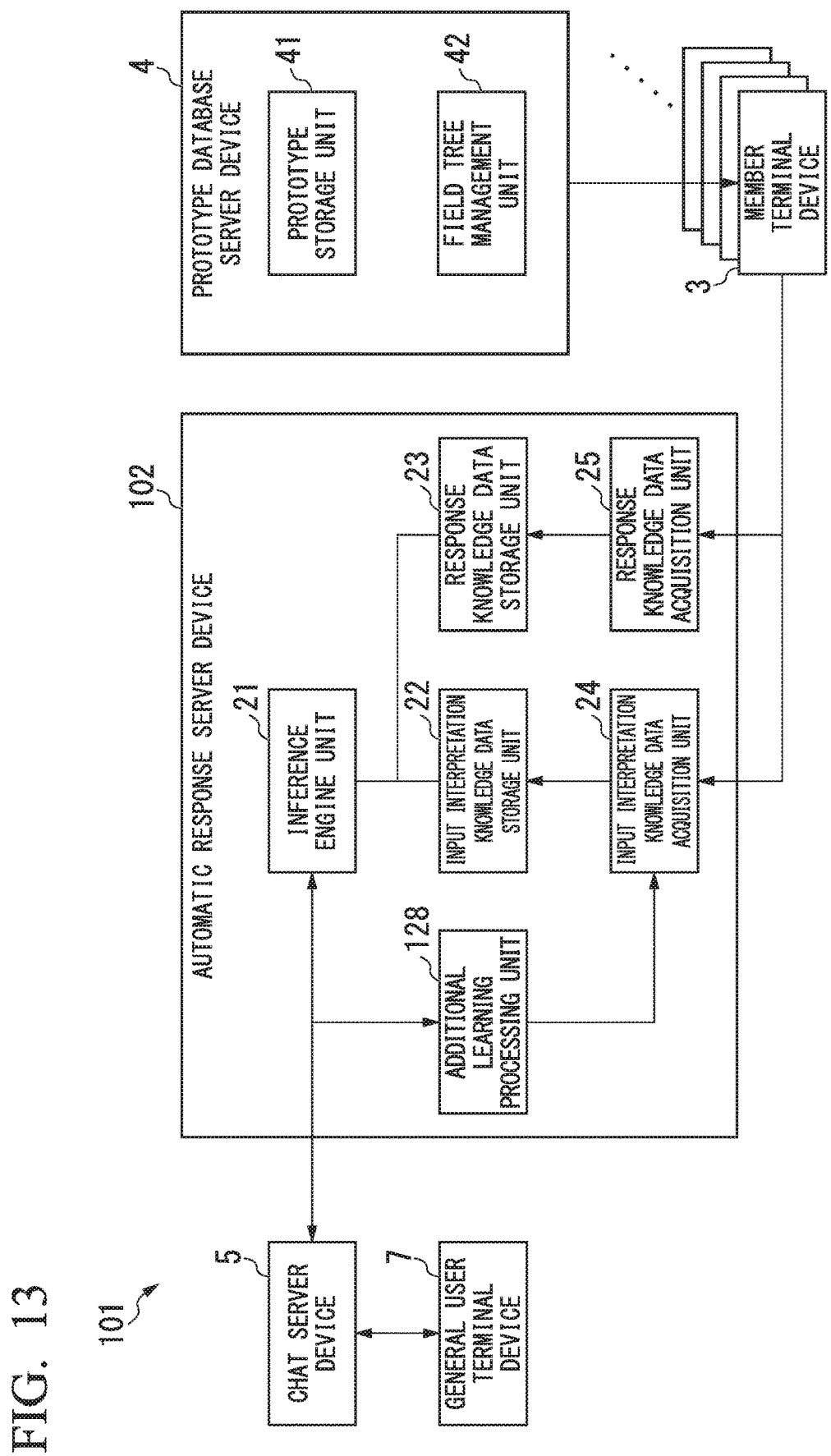
FIG. 13 is a block diagram showing a schematic functional configuration of a response system 101 according to a second embodiment of the present invention.

FIG. 13 is a block diagram showing a schematic functional configuration of a response system according to the second embodiment.

As shown, the response system 101 includes an automatic response server device 102, a member terminal device 3, a prototype database server device 4, a chat server device 5, and a general user terminal device 7. The present embodiment is characterized by including the automatic response server device 102 instead of the automatic response server device 2 in the prior embodiment.

As shown, the automatic response server device 102 includes an inference engine unit 21, an input interpretation knowledge data storage unit 22, a response knowledge data storage unit 23, an input interpretation knowledge data acquisition unit 24, a response knowledge data acquisition unit 25 and an additional learning processing unit 128.

Among these, the functions of the inference engine unit 21, the input interpretation knowledge data storage unit 22, the response knowledge data storage unit 23, the input interpretation knowledge data acquisition unit 24 and the response knowledge data acquisition unit 25 are the same as those in the first embodiment. The automatic response server device 102 in the present embodiments is characterized by having the additional learning processing unit 128.

The additional learning processing unit 128 performs an additional learning process between a virtual user processed by the inference engine unit 21 and a user of the general user terminal device 7 on the basis of text of an actual chat. Specifically, the additional learning processing unit 128 acquires text of an actual chat. The additional learning processing unit 128 acquires, from the outside, data representing whether determination of input text (inference of corresponding input fragments) performed by the inference engine unit 21 is a correct solution in the acquired chat. Whether the determination is a correct solution may be determined and input by a person, for example. In addition, the additional learning processing unit 128 performs a learning process having a chat determined to be a correct solution as a positive example and having a chat determined to be an error (not a correct solution) as a negative example. The learning process itself using a positive example and a negative example is the same as the learning process described as a process performed by the learning processing unit 34 in the first embodiment. That is, an error back propagation method is used as an example. The additional learning processing unit 128 transfers knowledge data which is a result of the learning process to the input interpretation knowledge data acquisition unit 24. Then, the input interpretation knowledge data acquisition unit 24 updates the input interpretation knowledge data storage unit 22 using the acquired knowledge data.

In the present embodiment, since a learning process is performed on the basis of text of an actual chat, accuracy of knowledge data is further improved. That is, the quality of chatting according to the automatic response server device 102 may be further enhanced.

Third Embodiment

Next, a third embodiment of the present invention will be described. Description of matters already described in the prior embodiments may be omitted below. Here, description will focus on characteristic matters of the present embodiment.

Figure 14:
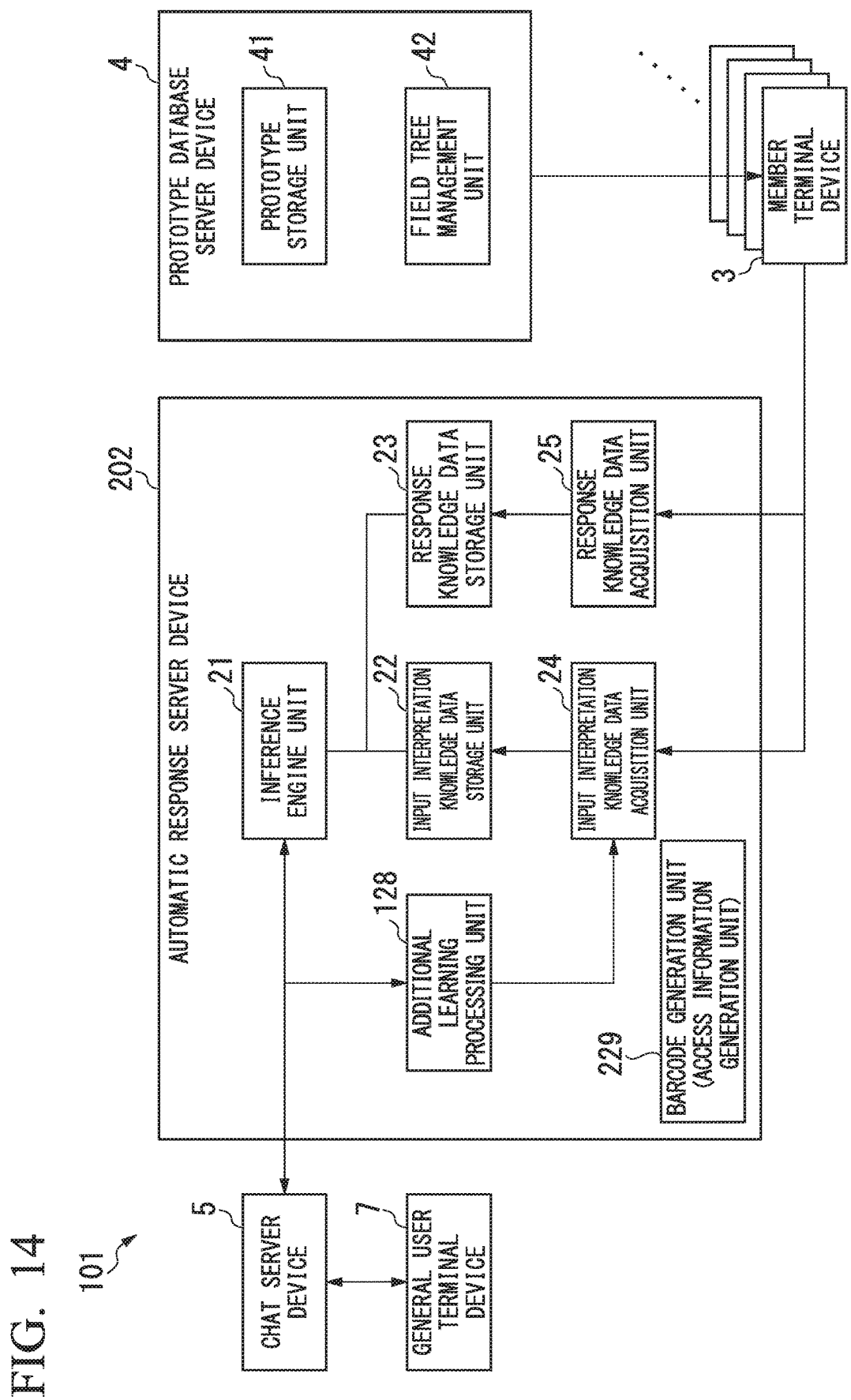
FIG. 14 is a block diagram showing a schematic functional configuration of a response system 101 according to a third embodiment of the present invention.

FIG. 14 is a block diagram showing a schematic functional configuration of a response system according to the third embodiment.

As shown, the response system 201 includes an automatic response server device 202, a member terminal device 3, a prototype database server device 4, a chat server device 5, and a general user terminal device 7. The present embodiment is characterized by including the automatic response server device 202 instead of the automatic response server device 102 in the prior embodiment.

As shown, the automatic response server device 202 includes an inference engine unit 21, an input interpretation knowledge data storage unit 22, a response knowledge data storage unit 23, an input interpretation knowledge data acquisition unit 24, a response knowledge data acquisition unit 25, an additional learning processing unit 128 and a barcode generation unit 229 (access information generation unit). Among these, the functions of the inference engine unit 21, the input interpretation knowledge data storage unit 22, the response knowledge data storage unit 23, the input interpretation knowledge data acquisition unit 24 and the response knowledge data acquisition unit 25 are the same as those in the first embodiment. The function of the additional learning processing unit 128 is the same as that in the second embodiment. The automatic response server device 202 in the present embodiment is characterized by having the barcode generation unit 229.

The barcode generation unit 229 generates optically readable code information including information (access information) for accessing a service of a specific chat room. For example, the barcode generation unit 229 may generate code information of a barcode, a two-dimensional code, a character string readable by an optical character reader (OCR), and the like. In addition, the barcode generation unit 229 transmits the generated code information to the member terminal device 3. Specifically, the barcode generation unit 229 transmits image data including a barcode, a two-dimensional code or the like, for example, to the member terminal device 3. The barcode acquisition unit 36 of the member terminal device 3 receives and prints out the optically readable code information transmitted from the barcode generation unit 229. The optically readable code information output in this manner may be optically read by the general user terminal device 7.

In the present embodiment, optically readable code information (i.e., image information through which access information can be optically read) is generated at the side of the automatic response server device. Accordingly, optically readable code information may be generated and managed in an integrated manner at the side of the automatic response server device.

The first to third embodiments have been described above. Hereinafter, modified examples of these embodiments will be described. In conceivable combinations, a plurality of modified examples may be combined and embodied.

Modified Example 1

In each of the above-described embodiments, as characteristics of input text in a chat, characteristic words extracted from the text have been used.

It has been assumed that characteristic words may be extended (substituted) using a synonym dictionary.

In modified example 1, other characteristics are used as characteristics of input text.

For example, syntactic analysis or dependency analysis of input text may be performed and a tree (syntactic analysis tree or dependency analysis tree) which is an analysis result is used as a characteristic. By using a result of syntactic analysis or dependency analysis in this manner, the accuracy of ascertaining the contents of the input text may be improved compared to cases in which characteristic words are simply extracted.

For example, when a first characteristic word and a second characteristic word appear in input text, the two characteristic words may be treated as different characteristics depending on whether they co-occur at positions close to or distant from each other in a syntactic analysis tree or a dependency analysis tree. Here, "close" or "distant" is planned according to a distance (the number of hops of an arc connecting nodes) between nodes of the tree.

Modified Example 2

In each of the above-described embodiments, the automatic response server device 2 (or 102), the prototype database server device 4 and the chat server device 5 have been configured as independent devices (computers and the like).

In modified example 2, a plurality of devices among these server devices are integrated and the plurality of functions thereof are implemented in one device. As an example, the automatic response server device 2 (102) and the prototype database server device 4 are integrated into one device. As another example, the automatic response server device 2 (102) and the chat server device 5 are integrated into one device. As another example, the prototype database server device 4 and the chat server device 5 are integrated into one device. The automatic response server device 2 (102), the prototype database server device 4 and the chat server device 5 may be integrated into one device.

Modified Example 3

In the above-described embodiments, a synonym dictionary may be registered.

Instead, existing synonym dictionary data may be prepared in advance and the inference engine unit 21 may refer to the synonym dictionary data in modified example 3. In this modified example 3, members need not individually set a word corresponding to a synonym dictionary one by one.

Modified Example 4

In the above-described embodiments, a case in which the general user terminal device 7 and a virtual user in the inference engine unit 21 perform one-to-one chatting has been described. In modified example 4, chatting is performed among three or more. For example, two or more general user terminal devices 7 (i.e., two or more general users) and a virtual user in the inference engine unit 21 may perform chatting. In this case, the chat server device 5 performs a process of handling chatting of three or more.

In the present modified example, the inference engine unit 21 may also interpret inputs from the general user terminal devices 7 on the basis of knowledge data and perform a process of returning responses on the basis of an interpretation result.

The function (or a part thereof) of each device in the above-described embodiments and modified examples may be realized by a computer. In such a case, a program for realizing the function may be recorded in a computer-readable recording medium and the function may be realized by causing a computer system to read and execute the program recorded in the recording medium. The "computer system" described here may include an OS and hardware such as a peripheral device. The "computer-readable recording medium" refers to a portable medium such as a flexible disk, a magneto-optic disc, a ROM, a CD-ROM, a DVD-ROM or a USB memory or a storage device such as a hard disk embedded in a computer system. Further, the "computer-readable recording medium" also includes a medium which dynamically stores programs for a short time, such as a communication line in a case in which programs are transmitted through a network such as the Internet or a communication link such as a telephone line, and a medium which stores programs for a certain time, such as a volatile memory in a computer system which is a server or a client in that case. The aforementioned program may be a program for realizing some of the above-described functions. Further, the program may be a program which can be realized by combining the above-described functions with programs which have already been recorded in a computer system.

Although embodiments of the present invention have been described in detail with reference to the drawings, specific configurations are not limited to these embodiments and designs and the like within a range without departing from the spirit or scope of the present invention are also included.

While some embodiments of the present invention have been described, these embodiments are exemplary and do not limit the scope of the invention. These embodiments may be embodied in various other forms, and various additions, omissions, substitutions and modifications of these embodiments can be made without departing from the spirit or scope of the invention. These embodiments and modifications thereof are included in the scope or spirit of the invention and included in the invention described in the claims and an equivalent range thereof.

The invention claimed is:

1. A response system comprising:
   an automatic response server device; and
   a plurality of terminal devices,
   wherein the terminal devices comprise:
   a chat pattern generation unit which generates information on a chat pattern which is a pattern of input fragments which are inputs to the automatic response server device and response fragments which are responses from the automatic response server to the input fragments in chatting;
   a learning processing unit which performs a learning process on the relationship between input text corresponding to the input fragments and the response fragments on the basis of the chat pattern generated by the chat pattern generation unit and outputs input interpretation knowledge data acquired as a result of the learning process;
   a response knowledge data transmission unit which transmits response knowledge data based on the response fragments included in the chat pattern generated by the chat pattern generation unit to the automatic response server device; and
   an input interpretation knowledge data transmission unit which transmits the input interpretation knowledge data output from the learning processing unit to the automatic response server device, and
   the automatic server device comprises:
   a response knowledge data storage unit which stores the response knowledge data transmitted from the response knowledge data transmission unit of the terminal devices;
   an input interpretation knowledge data storage unit which stores the input interpretation knowledge data transmitted from the input interpretation knowledge data transmission unit of the terminal devices; and
   an inference engine unit which outputs a response in a chat by inferring, on the basis of input text in the chat and the input interpretation knowledge data stored in the input interpretation knowledge data storage unit, the response fragments corresponding to the input text in the chat, from response knowledge data stored in the response knowledge data storage unit, and reading response knowledge data corresponding to the inferred response fragments from the response knowledge data storage unit.

2. The response system according to claim 1, further comprising a prototype database server device including a prototype storage unit which stores a prototype of the chat pattern,
   wherein the chat pattern generation unit generates the information on the chat pattern on the basis of the prototype acquired from the prototype database server device.

3. The response system according to claim 2, wherein the prototype database server device includes a field information management unit which manages information on a field to which the prototype belongs, and the prototype is managed by being associated with the field.

4. The response system according to claim 1, wherein the terminal devices further comprise an access information acquisition unit which acquires access information for accessing a chat in which the result of the learning process is reflected when the learning process performed by the learning processing unit is completed.

5. The response system according to claim 4, wherein the automatic response server device further includes an access information generation unit which generates image information including the access information which is optically readable, and the access information acquisition unit acquires image information including the optically readable access information generated by the access information generation unit.

6. The response system according to claim 1, wherein the inference engine unit is connected to a chat server device which provides a service of chatting between users to perform chatting with a general user terminal device performed through the chat server device,
   the input text in the chat is transmitted from the general user terminal device to the inference engine unit through the chat server device, and
   the response in the chat is output by the inference engine unit and transmitted to the general user terminal device through the chat server device.

7. The response system according to claim 6, further comprising a general user terminal device which transmits the input text in the chat to the inference engine unit through the chat server device and receives the response output from the inference engine unit through the chat server device.

8. The response system according to claim 4, further comprising a general unit terminal device which reads the access information acquired by the access information acquisition unit in the terminal devices according to an optical reading device, accesses the chat on the basis of the read access information, transmits the input text in the chat to the inference engine unit through the chat server device, and receives the response output from the inference engine unit through the chat server device.

9. A response method using an automatic response server device and a plurality of terminal devices, comprising, in the terminal devices:
   a chat pattern generation unit generating information on a chat pattern which is a pattern of input fragments which are inputs to the automatic response server device and response fragments which are responses from the automatic response server to the input fragments in chatting;
   a learning processing unit performing a learning process on the relationship between input text corresponding to the input fragments and the response fragments on the basis of the chat pattern generated by the chat pattern generation unit and outputting input interpretation knowledge data acquired as a result of the learning process;
   a response knowledge data transmission unit transmitting response knowledge data based on the response fragments included in the chat pattern generated by the chat pattern generation unit to the automatic response server device; and
   an input interpretation knowledge data transmission unit transmitting the input interpretation knowledge data output from the learning processing unit to the automatic response server device, and
   in the automatic server device,
   a response knowledge data storage unit storing the response knowledge data transmitted from the response knowledge data transmission unit of the terminal devices;
   an input interpretation knowledge data storage unit storing the input interpretation knowledge data transmitted from the input interpretation knowledge data transmission unit of the terminal devices; and
   an inference engine unit outputting a response in a chat by inferring, on the basis of input text in the chat and the input interpretation knowledge data stored in the input interpretation knowledge data storage unit, the response fragments corresponding to the input text in the chat, from response knowledge data stored in the response knowledge data storage unit, and reading response knowledge data corresponding to the inferred response fragments from the response knowledge data storage unit.

10. A terminal device comprising:
   a chat pattern generation unit which generates information on a chat pattern which is a pattern of input fragments which are inputs to an automatic response server device and response fragments which are responses from the automatic response server device to the input fragments in chatting;
   a learning processing unit which performs a learning process on the relationship between input text corresponding to the input fragments and the response fragments on the basis of the chat pattern generated by the chat pattern generation unit and outputs input interpretation knowledge data acquired as a result of the learning process;
   a response knowledge data transmission unit which transmits response knowledge data based on the response fragments included in the chat pattern generated by the chat pattern generation unit to the automatic response server device; and
   an input interpretation knowledge data transmission unit which transmits the input interpretation knowledge data output from the learning processing unit to the automatic response server device.

11. An automatic server device comprising:
   a response knowledge data storage unit which stores response fragments which are responses to input fragments which are inputs in a chat as response knowledge data on the basis of a chat pattern generated in an external terminal device;

an input interpretation knowledge data storage unit which stores input interpretation knowledge data which is input interpretation knowledge data generated according to a learning process in the terminal device and is acquired as a result of the learning process performed on the relationship between input text corresponding to the input fragments in the chat pattern and response fragments corresponding to the input fragments; and an inference engine unit which outputs a response in a chat by inferring, on the basis of input text in the chat and the input interpretation knowledge data stored in the input interpretation knowledge data storage unit, the response fragments corresponding to the input text in the chat, from response knowledge data stored in the response knowledge data storage unit, and reading response knowledge data corresponding to the inferred response fragments from the response knowledge data storage unit.

12. A non-transitory computer readable medium having recorded thereon a program which when executed by a computer causes the computer to serve as a terminal device, the terminal device comprising:

a chat pattern generation unit which generates information on a chat pattern which is a pattern of input fragments which are inputs to an automatic response server device and response fragments which are responses from the automatic response server to the input fragments in chatting;

a learning processing unit which performs a learning process on the relationship between input text corresponding to the input fragments and the response fragments on the basis of the chat pattern generated by the chat pattern generation unit and outputs input interpretation knowledge data acquired as a result of the learning process;

a response knowledge data transmission unit which transmits response knowledge data based on the response fragments included in the chat pattern generated by the chat pattern generation unit to the automatic response server device; and an input interpretation knowledge data transmission unit which transmits the input interpretation knowledge data output from the learning processing unit to the automatic response server device.

13. A non-transitory computer readable medium having recorded thereon a program which when executed by a computer causes the computer to serve as an automatic response server device, the computer comprising:

a response knowledge data storage unit which stores response fragments which are responses to input fragments which are inputs in a chat as response knowledge data on the basis of a chat pattern generated in an external terminal device; and an input interpretation knowledge data storage unit which stores input interpretation knowledge data which is input interpretation knowledge data generated according to a learning process in the terminal device and is acquired as a result of the learning process performed on the relationship between input text corresponding to the input fragments in the chat pattern and response fragments corresponding to the input fragments and the-automatic response server device comprising an inference engine unit which outputs a response in a chat by inferring, on the basis of input text in the chat and the input interpretation knowledge data stored in the input interpretation knowledge data storage unit, the response fragments corresponding to the input text in the chat, from response knowledge data stored in the response knowledge data storage unit, and reading response knowledge data corresponding to the inferred response fragments from the response knowledge data storage unit.

\* \* \* \* \*